(12) United States Patent  
Pidutti et al.

(10) Patent No.: US 8,212,591 B2
(45) Date of Patent: Jul. 3, 2012

(54) CONTROL OF A RESONANT SWITCHING SYSTEM WITH MONITORING OF THE WORKING CURRENT IN AN OBSERVATION WINDOW

(75) Inventors: Albino Pidutti, Udine (IT); Stefano Beria, Zeccone (IT); Claudio Adragna, Monza (IT)

(73) Assignee: STMicroelectronics S.r.l., Agrate Brianza (MI) (IT)

( * ) Notice: Subject to any disclaimer, the term of this patent is extended or adjusted under 35 U.S.C. 154(b) by 0 days.

(21) Appl. No.: 13/109,314

(22) Filed: May 17, 2011

(65) Prior Publication Data

US 2012/0001662 A1    Jan. 5, 2012

Related U.S. Application Data

(63) Continuation of application No. 12/649,081, filed on Dec. 29, 2009, now abandoned.

(30) Foreign Application Priority Data

Dec. 30, 2008   (IT) ............................... MI2008A2356

(51) Int. Cl.
 *H03B 1/00* (2006.01)
(52) U.S. Cl. ....................................... 327/108; 327/110
(58) Field of Classification Search .................... None
 See application file for complete search history.

(56) References Cited

U.S. PATENT DOCUMENTS

| 5,742,134 | A | 4/1998 | Wacyk et al. |
| 6,002,214 | A | 12/1999 | Ribarich |
| 6,326,740 | B1 * | 12/2001 | Chang et al. .................. 315/291 |
| 6,900,599 | B2 | 5/2005 | Ribarich |
| 6,956,336 | B2 | 10/2005 | Ribarich |
| 7,259,523 | B2 * | 8/2007 | Veldman et al. ............... 315/291 |
| 7,408,307 | B2 | 8/2008 | Ribarich |
| 7,531,997 | B2 | 5/2009 | Mariani et al. |
| 8,018,694 | B1 * | 9/2011 | Wu ................................. 361/18 |
| 2007/0263421 | A1 * | 11/2007 | Kyono .......................... 363/127 |

\* cited by examiner

*Primary Examiner* — Cassandra Cox
(74) *Attorney, Agent, or Firm* — Wolf, Greenfield & Sacks, P.C.

(57) ABSTRACT

Controlling a resonant switching system, which includes a first switch and a second switch in a half-bridge configuration for driving a resonant load. A corresponding control system includes command means for switching on and switching off the switches alternatively according to a working frequency of the switching system. The control system includes detection means for detecting a zeroing of a working current being supplied by the switching system to the resonant load in a temporal observation window; the observation window follows each switching off of at least one of the switches, and has a length equal to a fraction of a to working period of the switching system. Correction means are then provided for modifying the working frequency in response to each detection of the zeroing in the observation window.

34 Claims, 15 Drawing Sheets

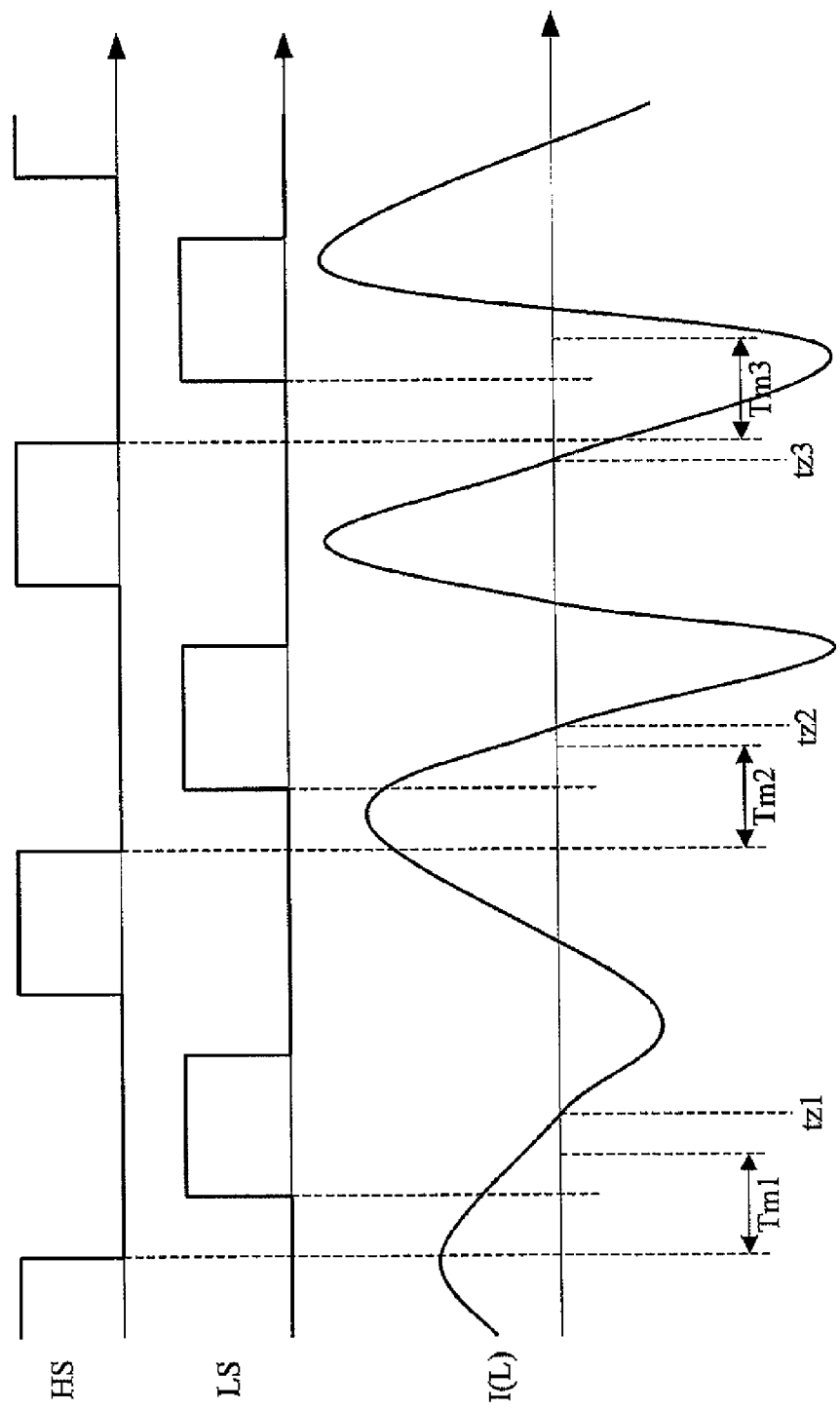

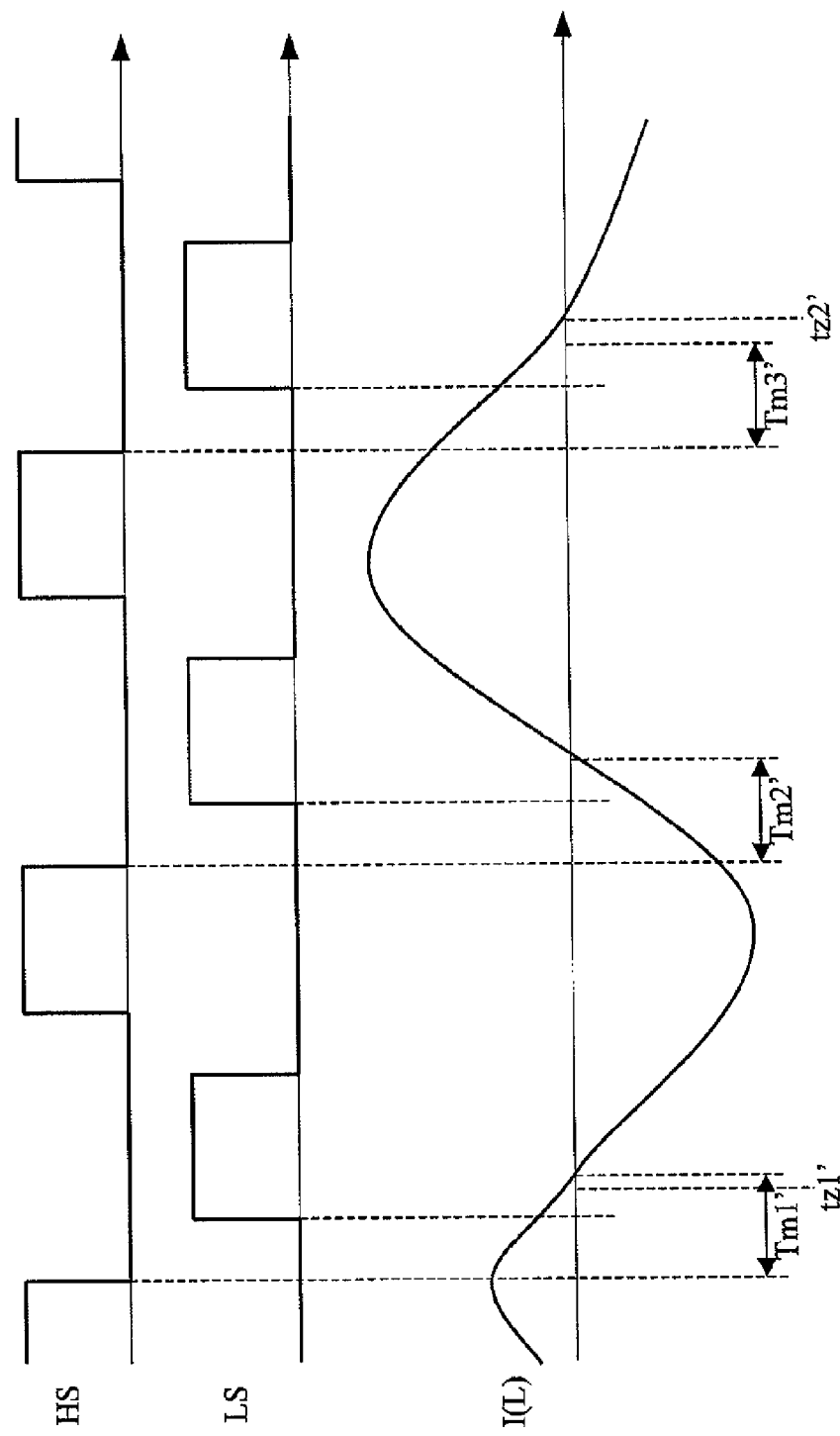

CONTROL OF A RESONANT SWITCHING SYSTEM WITH MONITORING OF THE WORKING CURRENT IN AN OBSERVATION WINDOW

CROSS REFERENCE TO RELATED APPLICATIONS

This application is a continuation of U.S. application Ser. No. 12/649,081, filed Dec. 29, 2009 entitled CONTROL OF A RESONANT SWITCHING SYSTEM WITH MONITORING OF THE WORKING CURRENT IN AN OBSERVATION WINDOW which application claims the priority benefit of Italian patent application number MI2008A002356, filed on Dec. 30, 2008, entitled "CONTROL OF A RESONANT SWITCHING to SYSTEM WITH MONITORING OF THE WORKING CURRENT IN AN OBSERVATION WINDOW," which applications are hereby incorporated by reference to the maximum extent allowable by law.

BACKGROUND OF THE INVENTION

1. Field of the Invention

The solution according to an embodiment of the present invention relates to the electronics field. More specifically, an embodiment relates to the control of a resonant switching system.

2. Discussion of the Related Art

Resonant switching systems are commonly used in various applications for driving electronic loads; a typical example is an electronic ballast for controlling the brightness of fluorescent lamps.

In general, a switching system of a ballast is based on two power transistors in a half-bridge configuration, which are switched on and off alternatively by proper control signals generated trough an oscillator, in this way, it is possible to obtain a power supply alternated voltage of the lamp at a desired frequency from a power supply direct voltage of the switching system (obtained from a mains alternated voltage at fixed frequency). The lamp is inserted in an RLC resonant circuit, which therefore has a reactance that is equal to zero at a resonant frequency thereof and increases moving away from it (becoming of the capacitive type or of the inductive type when the frequency decreases or increases, respectively); as a consequence, it is possible to control the reactance of the RLC circuit (and thus the current crossing the lamp) by properly varying the frequency of the oscillator (and thus the frequency of the alternated voltage). This allows controlling the brightness of the lamp in a simple and effective way, with reduced power losses (since the limitation of the current through the lamp is obtained without the use of any resistor).

The ballast can control the brightness of the lamp with either an open-loop or a closed-loop structure. In particular, U.S. Pat. No. 6,002,214 describes a ballast with a closed-loop control system based on the monitoring of the phase of the current of the resonant circuit with respect to its voltage (proportional to the power supplied to the lamp). The phase of the current is compared with the phase of the oscillator, so as to modify it accordingly for locking the phases of the current and of the oscillator to each other. For such purpose, there is proposed to detect an instant of zero-crossing by the current. Such result is obtained by comparing the voltage across a resistor in series with one of the transistors with a reference voltage, so as to obtain a pulse in correspondence of positive values of such voltage; the pulse and the command signal of the transistor are supplied to an AND gate for limiting the pulse to the period wherein such transistor is turned on. At the same time, a signal provided by the oscillator is compared with the same reference voltage, so as to obtain an opposed pulse in correspondence of negative values of such signal. The two pulses thus obtained are applied to an AND gate for obtaining an error signal having a length equal to their phase difference. The error signal charges a capacitor of the oscillator by an amount proportional to its length, so as to increase the frequency of the oscillator; on the contrary, when the two pulses are in phase, the capacitor is slightly discharged, so as to decrease the frequency of the oscillator.

In general, the transistors of the switching system are preferably turned on in a "soft" mode—that is, with a voltage substantially zero at their terminals. This allows limiting the power losses during the switching (with the possibility of reducing or even eliminating the cooling fins of the transistors); as a consequence, it is possible to increase the efficiency of the switching system, and to use smaller transistors. In any case, the area occupied by the transistors reduces, with the possibility of a more rational accommodation thereof. Moreover, such operating mode increases the reliability of the switching system. On the contrary, a "hard" turning on of the transistors—that is, with a voltage not null at their terminals—causes a significant increase of the power being dissipated during the switching and, in extreme cases, it may cause the breaking thereof.

Moreover, it is also preferable that the resonant circuit operates in the inductive mode. In fact, when the resonant circuit operates in the capacitive mode the current leads the voltage; therefore, the turning on of the transistors always occurs after the current has already started increasing the voltage at their terminals (so that such turning on cannot occur in the soft mode, with the drawbacks pointed out above). In addition, since the possible control system of the ballast acts on the oscillator frequency, it follows that the open loop gain depends on the derivative of the impedance of the resonant circuit with respect to the frequency. However, such derivative is negative in the inductive operation mode (where the gain decreases with the increase of the frequency moving away from the resonance frequency) and positive in the capacitive operation mode (wherein the gain increases with the increase of the frequency towards the resonance frequency). Therefore, passing from the inductive operation mode to the capacitive operation mode the feedback of the closed loop changes sign, turning a feedback to being designed to be negative into a positive feedback (with subsequent risk of instability).

Another problem of the switching systems with closed-loop control systems occurs when the mains voltage decreases below a nominal value thereof (situation that may occur in certain locations for relatively long periods, even of several hours), with a consequent decrease in the obtained direct voltage and thus in the alternated voltage being supplied to the lamp. In such condition, the control system decreases the frequency (towards the resonance frequency in the inductive operation mode) for increasing the current and thus maintaining a constant brightness of the lamp (notwithstanding the decrease of the alternate voltage). This may bring the resonant circuit to operate in the capacitive mode, with the same above-listed drawbacks.

In order to avoid such drawbacks, the ballasts are sized so as to ensure their correct operation in most practical conditions (for example, by imposing a lower limit to the frequency). However, this does not allow using the lamp optimally, since the limits imposed by the worst operating conditions (including the inevitable spreads of the operating characteristics—for example, of the lamp, of the ballast, of the components and of the mains voltage) adversely affect the normal operating conditions. Moreover, this does not allow ensuring the correct operation of the lamp in emergency conditions.

SUMMARY OF THE INVENTION

In its general terms, a solution according to an embodiment of the present invention is based on the idea of monitoring the operation of the switching system in an observation window.

More specifically, an aspect of a solution according to an embodiment of the invention provides a control system for controlling a resonant switching system; the switching system includes a first switch and a second switch (for example, two power MOSs) in a half-bridge configuration, which are used for driving a resonant load (for example, in a ballast for controlling the brightness of a fluorescence lamp). The control system includes command means (for example, based on an oscillator) for switching on and switching off the switches alternatively according to a working frequency of the switching system. In a solution according to an embodiment of the invention, the control system includes detection means for detecting a zeroing of a working current being supplied by the switching system to the resonant load (for example, when the voltage at the terminals of a resistor in series with one of the two switches becomes zero) in a temporal observation window; the observation window follows each switching off of at least one of the switches and has a length equal to a fraction of a working period of the switching system. Correction means are then provided for modifying the working frequency in response to each detection of the zeroing in the observation window (for example, by increasing in a pulsed way the frequency by an amount corresponding to the leading of the zeroing).

Another aspect of a solution according to an embodiment of the invention provides a complex system (for example, a ballast), which includes a switching system and such control system for controlling the switching system.

A further aspect of a solution according to an embodiment of the invention provides a corresponding method of controlling a switching system (with the same advantageous features recited in the dependent claims for the control system that apply mutatis mutandis to the method).

BRIEF DESCRIPTION OF THE DRAWINGS

A solution according to one or more embodiments of the invention, as well as further features and the advantages thereof, will be best understood with reference to the following detailed description, given purely by way of a non-restrictive indication, to be read in conjunction with the accompanying drawings. In this respect, it is expressly intended that the figures are not necessarily drawn to scale and that, unless otherwise indicated, they are simply used to conceptually illustrate the described structures and procedures. In particular:

FIGS. 9A-9B show different exemplary scenarios of application of the solution according to an embodiment of the invention.

DETAILED DESCRIPTION

Figure 1A:
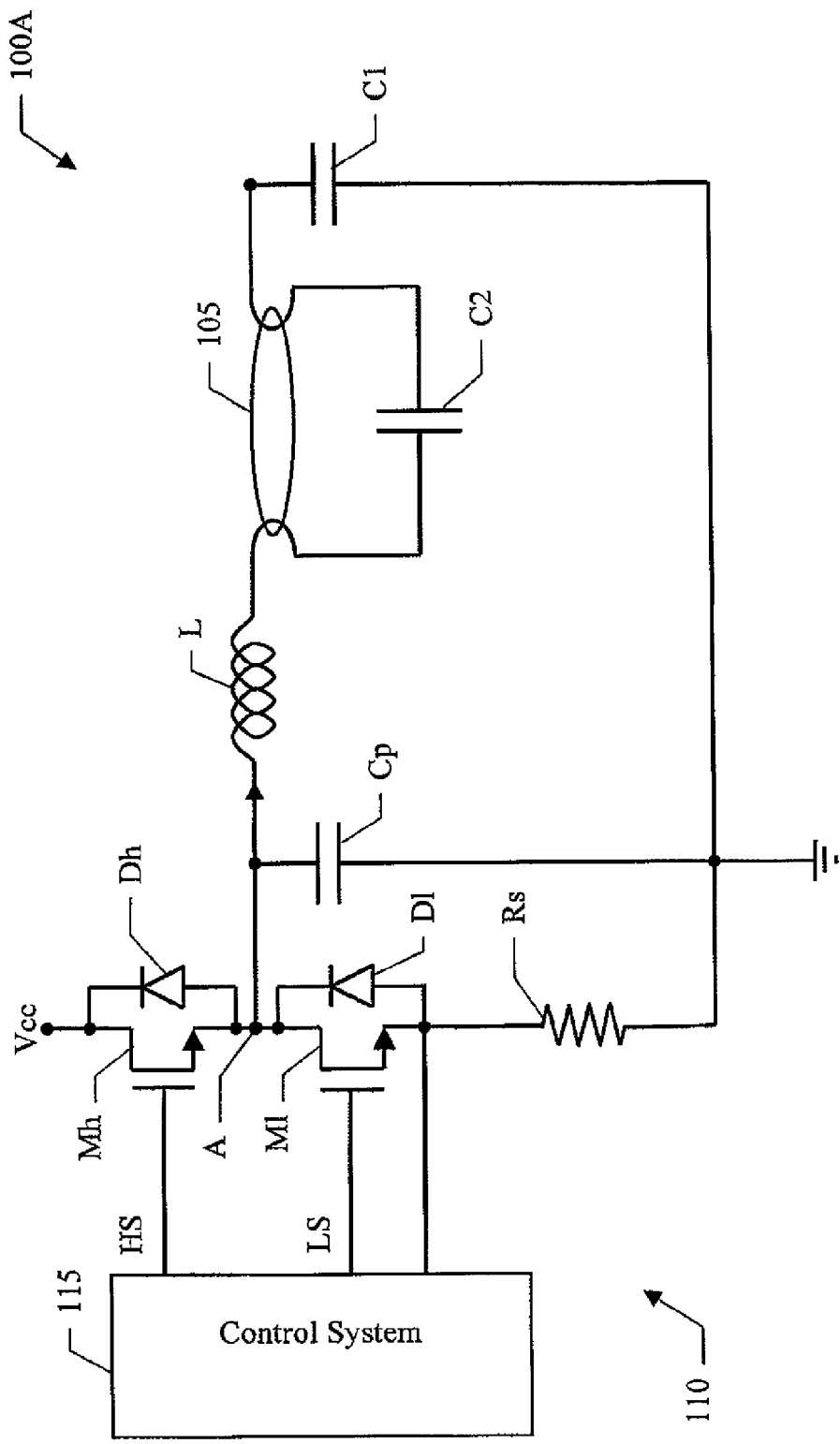
FIG. 1A is a circuit scheme of a lighting device known in the art.

With reference in particular to FIG. 1A, there is shown a circuit scheme of a lighting device 100A known in the art. The lighting device 100A includes a lamp 105 (for example, of the fluorescent type). A ballast 110 is used to control a power supply of the lamp 105, both for allowing its switching on and for adjusting its brightness.

The ballast 110 includes a switching system, which comprises a low-side NMOS power transistor M1 and a high-side NMOS power transistor Mh being connected to each other in a half-bridge configuration. In particular, a drain terminal of the transistor Mh is connected to a power supply terminal Vcc, which receives a corresponding direct supply voltage—for example, Vcc=300-500V with respect to a reference voltage (or ground) provided by a corresponding terminal; generally, the voltage Vcc is generated by a mains alternated voltage, which is rectified and regulated—for example, through a Power Factor Corrector (PFC) not shown in the figure. A source terminal of the transistor Mh and a drain terminal of the transistor M1 are connected to each other, so as to define an output node A of the half-bridge M1,Mh. A source terminal of the transistor M1 is connected to the ground terminal through a sensing resistor Rs. For each transistor M1 and Mh, the figure also shows a corresponding intrinsic diode D1 and Dh; each diode D1 and Dh has an anode terminal and a cathode terminal connected to the source terminal and to the drain terminal, respectively, of the corresponding to transistor M1 and Mh. The transistors M1,Mh are switched on and off alternatively with a duty cycle of 50%, so as to provide a supply voltage to the node A having a rectangular wave form varying from the zero voltage (transistor M1 switched on and transistor Mh switched off) and the voltage Vcc (transistor Mh switched on and transistor M1 switched off) with a desired working frequency fo.

For such purpose, the transistors M1 and Mh are driven by a control system 115. In particular, the control system 115 provides a control signal LS to a gate terminal of the transistor M1 and a control signal HS to a gate terminal of the transistor Mh. The signals LS and HS may have a low level for switching off the corresponding transistors M1 and Mh (for example, equal to the zero voltage and to the voltage Vcc, respectively), and a high level for switching on the corresponding transistors M1 and Mh (for example, greater of 3-5V with respect to their low level). The signals LS,HS are always opposite to each other (for switching on only one transistor M1,Mh at a time). Furthermore, the signals LS,HS are non-overlapped, so that each signal LS,HS is brought to the high level with a predetermined delay (called dead-time) with respect to the instant wherein the other signal LS,HS is brought to the low level; this ensures that the two transistors M1,Mh are not on simultaneously, thus avoiding any cross-conduction phenomena, in which there would be created a short circuit across the half-bridge M1,Mh that could produce current spikes being destructive for the transistors M1,Mh (caused by the fact that a turn-off time of each transistor is generally higher than a turn-on time of the other transistor). Besides, the control system 115 is connected to the source terminal of the transistor M1 for measuring a voltage across the resistor Rs, and hence a current relating to the low-side of the half-bridge M1,Mh (for example, for implementing a maximum current protection system).

The lamp 105 is inserted in an RLC resonant circuit. In particular, the lamp 105 is connected to the node A through an inductor L, and is connected to the ground terminal through a capacitor C1 (called half-battery capacitor); another capacitor C2 is instead connected in parallel to the lamp 105. When the lamp 105 is switched on, the capacitor C2 is substantially immaterial since it is by-passed by the lamp 105 (having a very low resistance). In such condition, the RLC circuit allows controlling a working current through the lamp 105 by varying the frequency fo of the voltage at the node A (with the working current that reaches a maximum value when the working frequency fo is equal to a resonance frequency of the RLC circuit, and decreases when the frequency fo departs from this value). On the contrary, to when the lamp 105 is switched off (with a very high resistance), the capacitor C2 allows applying a very high voltage to the lamp 105 for obtaining its switching on (up to the voltage at the node A multiplied by a quality factor of the RLC circuit at the resonance frequency). A capacitor Cp connected between the node A and the ground terminal instead represents a parasitic capacitance of the whole lighting device 100A (for example, associated with the transistors M1 and Mh, the lamp 105, connection terminals, and the like).

Figure 1B:
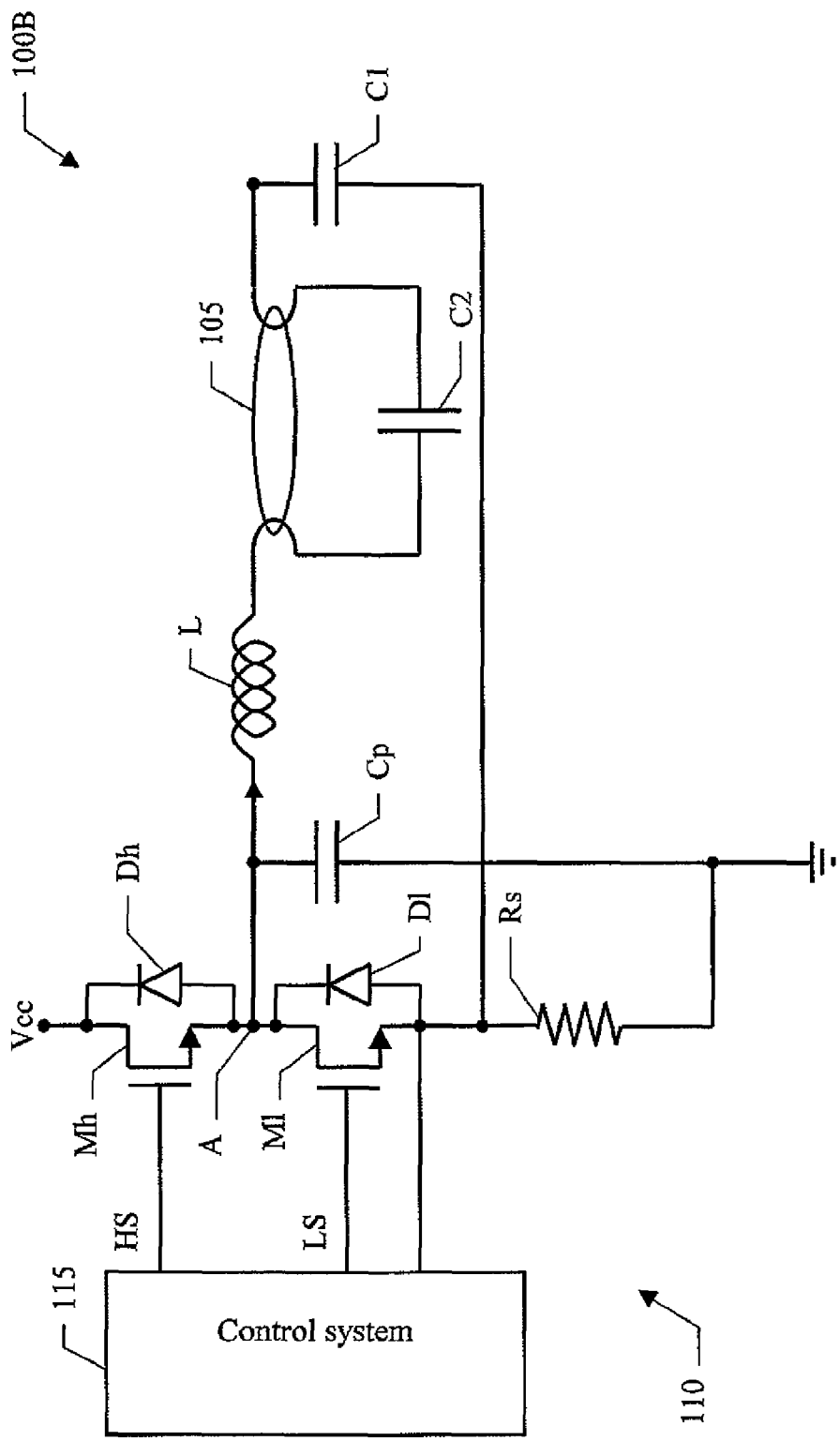
FIG. 1B is circuit scheme of another lighting apparatus known in the art.

A variant known in the art of the same structure is illustrated in FIG. 1B (hereinafter, the elements corresponding to those shown in the previous figures are indicated with the same references, and their explanation is omitted for the sake of exposition brevity). In such case, there is shown a circuit scheme of a lighting device 100B, in which the capacitor C1 is connected between the lamp 105 and the source terminal of the transistor M1 (instead of the ground terminal). As a consequence, in dual mode the resistor Rs conducts the current relating to the high side of the half-bridge M1,Mh.

Figure 2A:
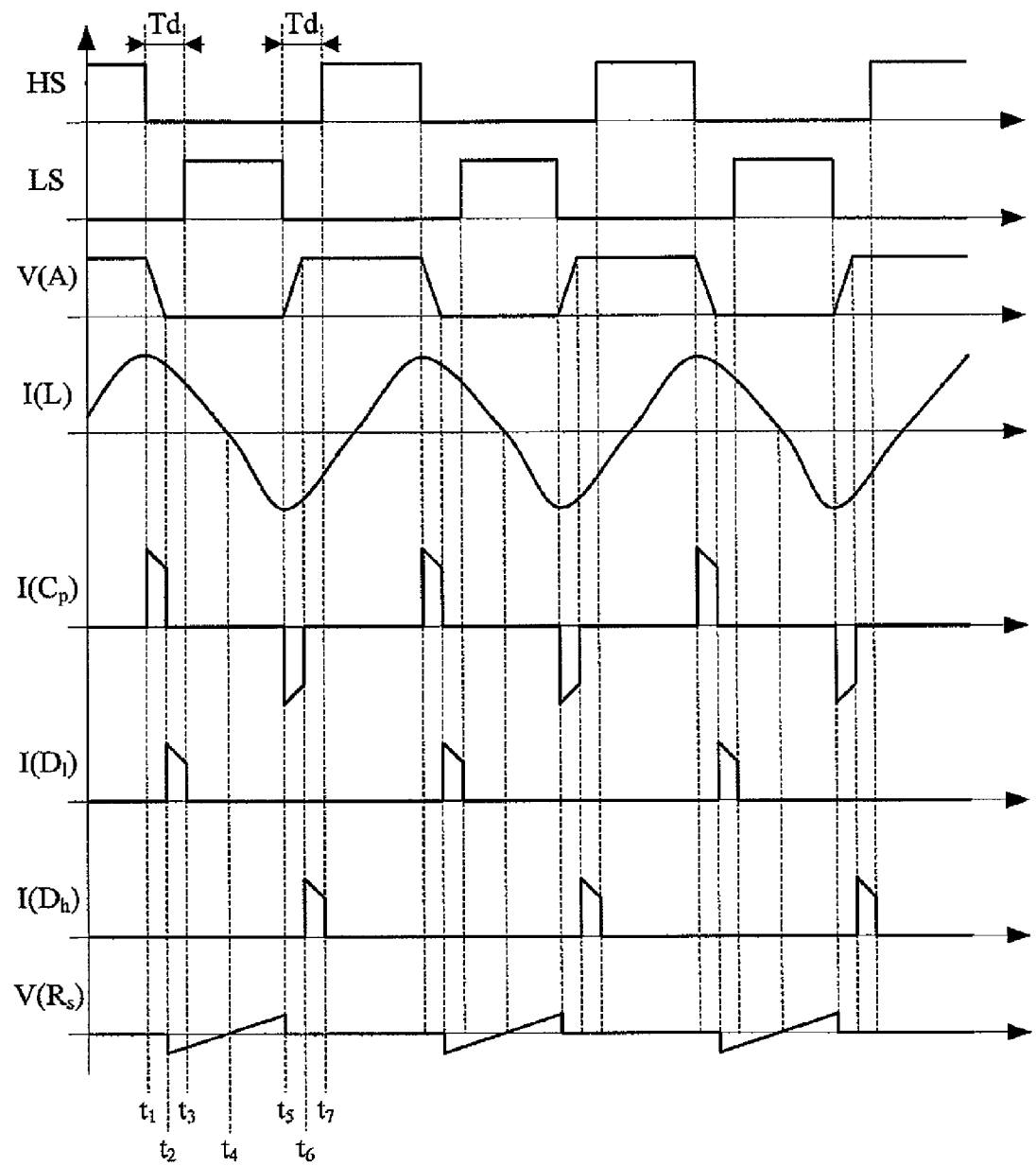
FIG. 2A is a qualitative time diagram showing the waveforms of some electrical quantities of the device of FIG. 1A.

A qualitative time diagram showing the waveforms of some electrical quantities of the device of FIG. 1A (with the lamp being already switched on) is illustrated in FIG. 2A. Considering these figures together, we start, for example, from a condition in which the signal HS is at the high level and the signal LS is at the low level. In such condition, the transistor Mh is switched on and the transistor M1 is switched off, so that the voltage at the node A—denoted by V(A)—is at the value Vcc. As a consequence, the current through the inductor L—denoted by I(L)—flows in the direction indicated in the figure (with the capacitor C1 that is charged up to a value approximately equal to Vcc/2 with substantially negligible ripple because of its high-capacity).

The signal HS is brought to the low level at the time $t_1$, so as to switch off the transistor Mh. The current I(L) through the inductor L cannot change instantaneously, and then it begins decreasing by flowing through the capacitor Cp—whose current is denoted by I(Cp); in this way, the capacitor Cp is discharged bringing the voltage V(A) from the original value Vcc to the zero value. When this happens (time $t_2$), the current I(L) continues decreasing through the resistor Rs and the diode D1 that is brought into conduction—whose current is denoted by I(D1); as a consequence, the voltage across the resistor Rs—denoted by V(R)—passes from the zero value to a negative value, and then decreases in absolute value according to the current I(L). In such condition, the voltage V(A) reaches a negative value equal to the sum of the voltage V(Rs) plus the threshold voltage of the diode D1; in any case, such voltage V(A) has a value small enough to be considered substantially zero.

At this point, after the dead-time—denoted by Td—from the switching off of the transistor Mh, it is possible to bring the signal LS to the high level (time $t_3=t_1+Td$), so as to switch on the transistor M1. The switching on of the transistor M1 should take place before the current I(L) zeroes. In fact, this allows obtaining a soft switching on with zero voltage between the drain terminal and the source terminal of the transistor M1. On the contrary, after the zeroing of the current I(L) the diode D1 would turn off and the current I(L) would increase in the opposite direction hence charging the capacitor Cp (through the capacitor C1), so as to increase the voltage V(A) and thus causing a hard switching on of the transistor M1, (with a non-zero voltage between the drain terminal and the source terminal thereof).

After switching on the transistor M1, the current I(L) and hence the voltage V(Rs) continues decreasing, until both of them become zero at the time $t_4$. The current I(L) and the voltage V(Rs) then begin increasing in the opposite direction through the resistor Rs and the transistor M1 (with the diode D1 that is cut-off).

The signal LS is brought to the low level at the time $t_5$, so as to switch off the transistor M1—zeroing the current through the resistor Rs, and hence the voltage V(Rs). In such way, the current I(L) begins decreasing in absolute value flowing through the capacitor Cp, with the capacitor Cp that is charged bringing the voltage V(A) from the initial zero value to the value Vcc. When this occurs (time $t_6$), the current I(L) continues decreasing in absolute value through the diode Dh that is brought into conduction. At this point, after the dead-time Td from the switching off of the transistor M1, it is possible to bring the signal HS to the high value (time $t_7=t_5+Td$), so as to switch on the transistor Mh. In this case as well, the switching on of the transistor Mh should occur before the current I(L) zeroes (so as to obtain a soft switching on); on the contrary, after the zeroing of the current I(L) the diode Dh would cut-off and the current I(L) would increase in the opposite direction discharging the capacitor Cp, so as to decrease the voltage V(A) and thus causing a hard switching on of the transistor Mh.

The same operations described above are repeated continuously for each working period (1/fo) of the switching system.

Figure 2B:
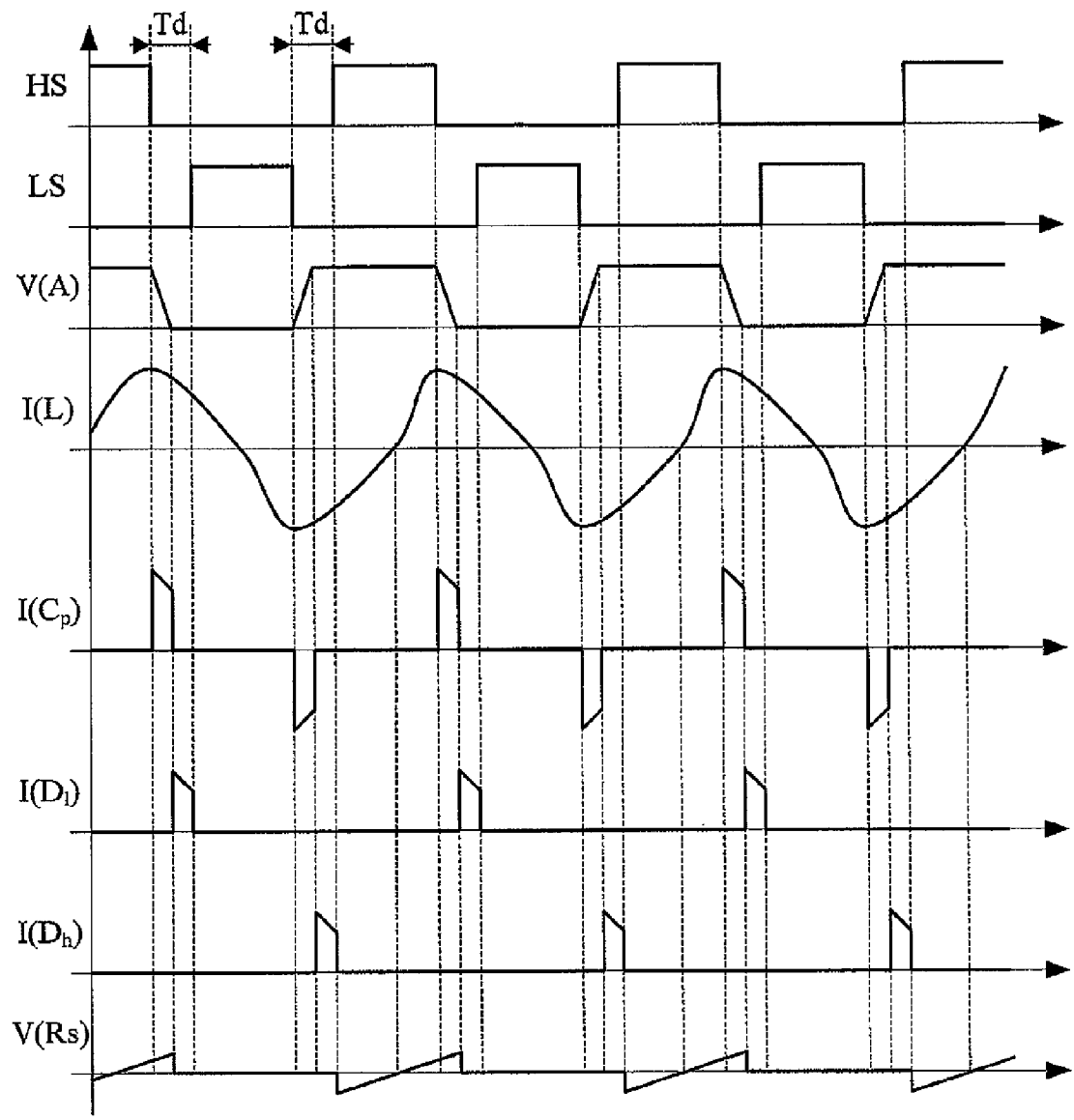
FIG. 2B is a qualitative time diagram showing the waveforms of some electrical quantities of the device of FIG. 1B.

A time diagram showing the qualitative waveforms of the same electrical quantities of the device of FIG. 1B (with the lamp already switched on) is shown in FIG. 2B. These wave forms are equal to those described above, with the only difference that the voltage V(Rs) is out of phase by 180°, since the resistor Rs now conducts the current I(L) corresponding to the transistor Mh.

Figure 3A:
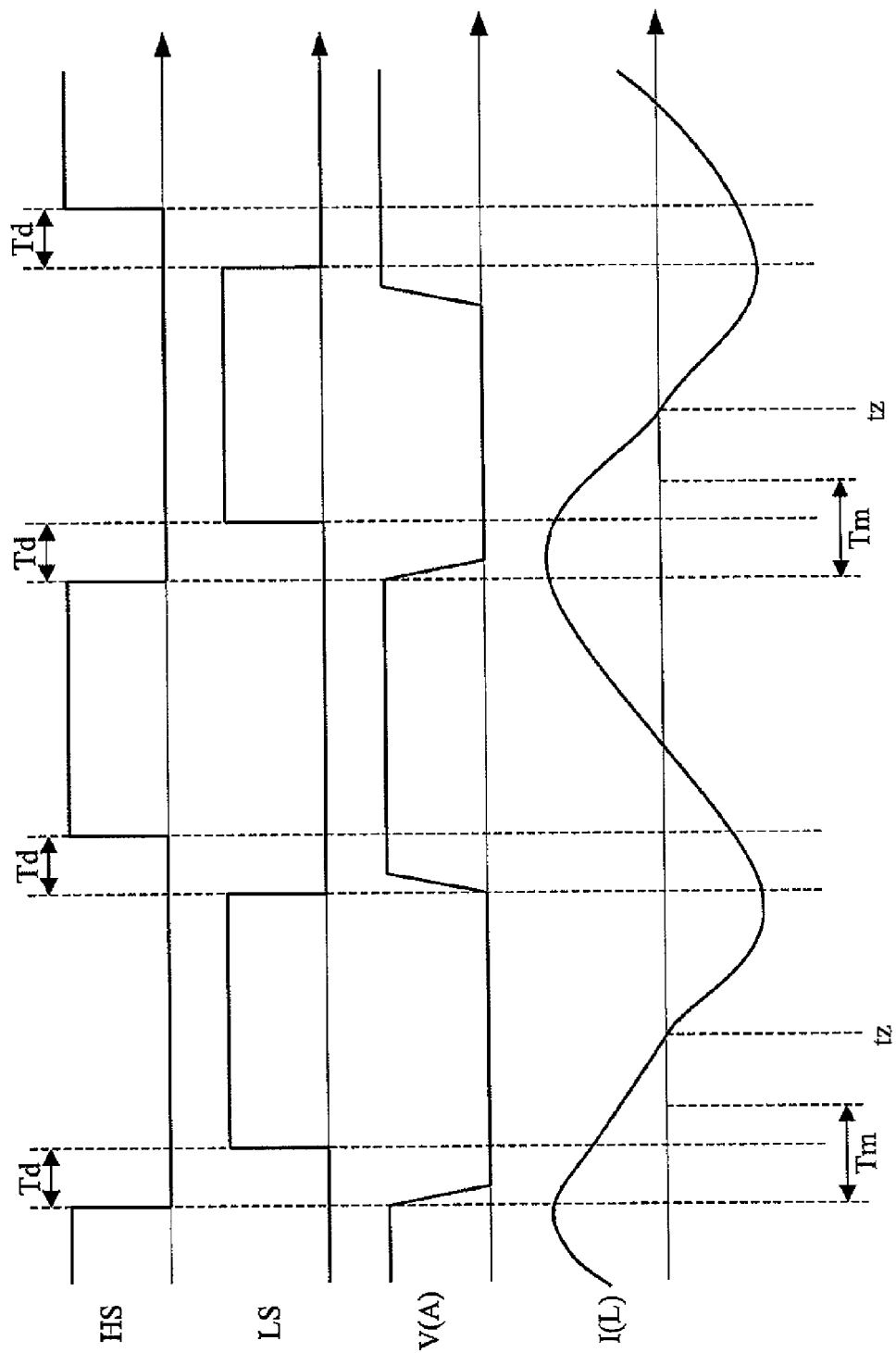
FIGS. 3A-3B show an exemplary application of the solution according to an embodiment of the invention.
Figure 3B:
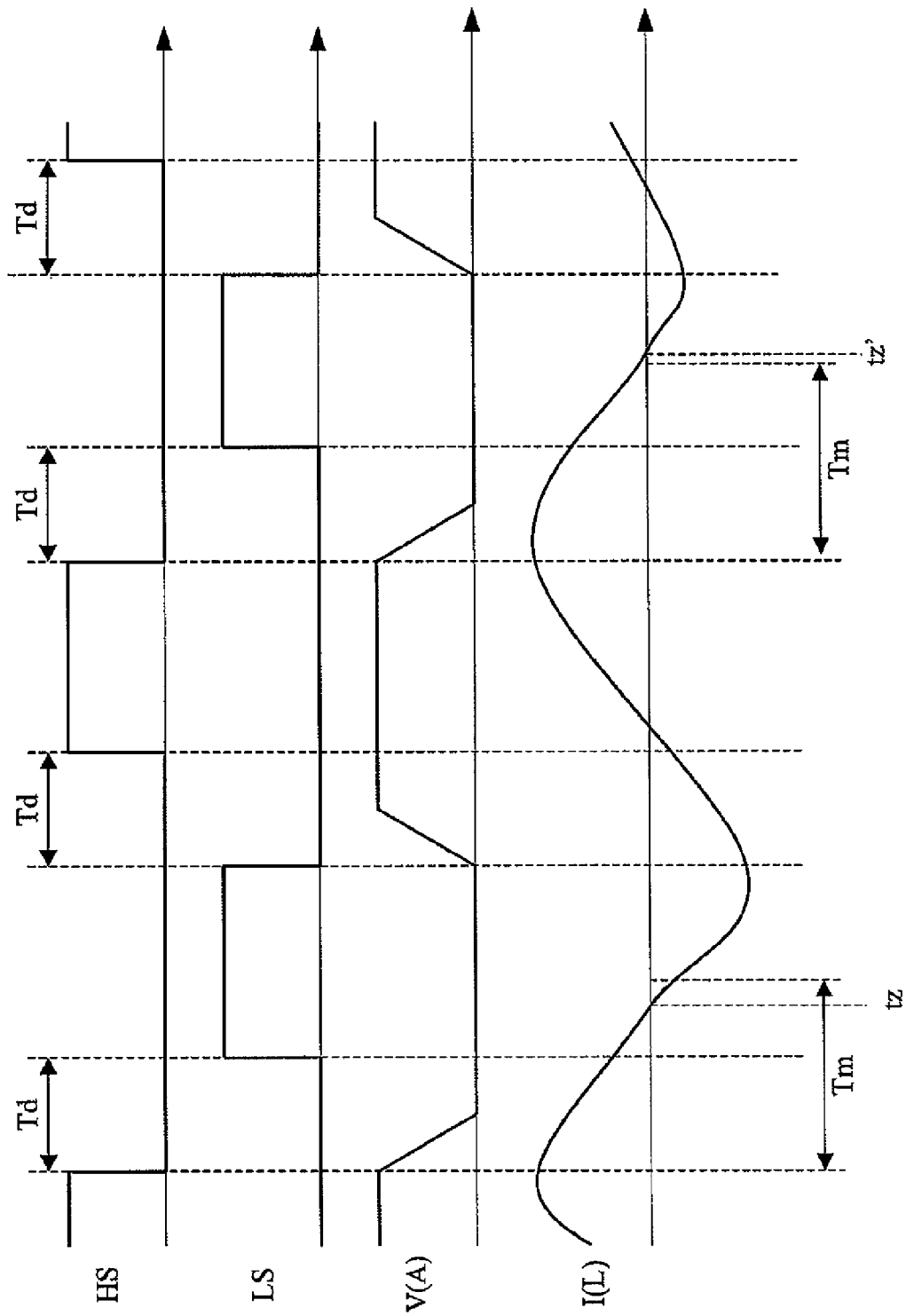

An exemplary application of a solution according to an embodiment of the invention is shown in FIGS. 3A-3B. In particular, the current I(L) is monitored for detecting an instant of zero-crossing wherein its value is zeroed—denoted by tz—in a temporal observation window Tm. In the case of the circuit of FIG. 1A (dual considerations apply in the case of the circuit of FIG. 1B), the zero-crossing instant tz concerns the transition of the current I(L) from a positive value to a negative value; in such case, the observation window Tm begins at each switching of the signal HS from the high level to the low level (switching off of the transistor Mh). The observation window Tm has a length equal to a fraction of the period 1/fo—in any case, being not lower than the dead-time Td. For example, the window Tm may be equal to 5-15%, and preferably equal to 8-12% (for example, equal to 10%) of the period 1/fo.

If the zero-crossing instant tz is outside the observation window Tm (as shown in FIG. 3A), the switching on of the transistor M1 correctly occurs in the soft mode. Moreover, the falling edge of the current I(L) follows the falling edge of the voltage V(A); this means that in the RLC circuit the current lags the voltage, so that it works correctly in the inductive mode.

On the contrary, if the zero-crossing instant tz is within the observation window Tm (as shown in FIG. 3B), this means that the operation of the ballast is approaching a danger condition (where the switching on of the transistor M1 may occur in hard mode, and the operation of the RLC circuit may switch to the capacitive mode). When this occurs, the control system varies the frequency fo accordingly (for example, by increasing it of a predefined amount).

In such way, it is possible to restore the correct operation of the ballast automatically. In fact, the ballast is sized in order to operate with a certain safety margin, so that usually the zero-crossing instant tz is sufficiently delayed. Therefore, the danger condition does not occur with sudden changes of the zero-crossing instant tz, but with its slow drift. However, as soon as the zero-crossing instant tz falls within the observation window Tm, the frequency fo is increased for reducing the current I(L) and thus delaying the zero-crossing instant (denoted by tz' in the figure). Such step is repeated every period 1/fo, until the ballast is brought again to its correct operation.

The same mechanism also allows maintaining the operation of the RLC circuit in the inductive mode. In fact, when the falling edge of the current I(L) approaches the falling edge of the voltage V(A)—that is, towards the capacitive operation more—the zero-crossing instant tz moves towards the observation window Tm; when the zero-crossing instant tz reaches the observation window Tm (before switching to the capacitive mode), the increase of the to frequency fo being forced by the control system moves the operation of the RLC circuit towards the inductive mode.

Moreover, this allows ensuring the correct operation of the ballast also in case of mains low voltage (and hence low voltage Vcc). Also in this case, if the reduction of the frequency fo (forced by the control system for increasing the current and thus maintaining a constant brightness of the lamp) brings the zero-crossing instant tz within the observation window Tm, the frequency fo is automatically increased; this allows using the lamp in total security (at reduced brightness) even under these conditions.

Figure 4:
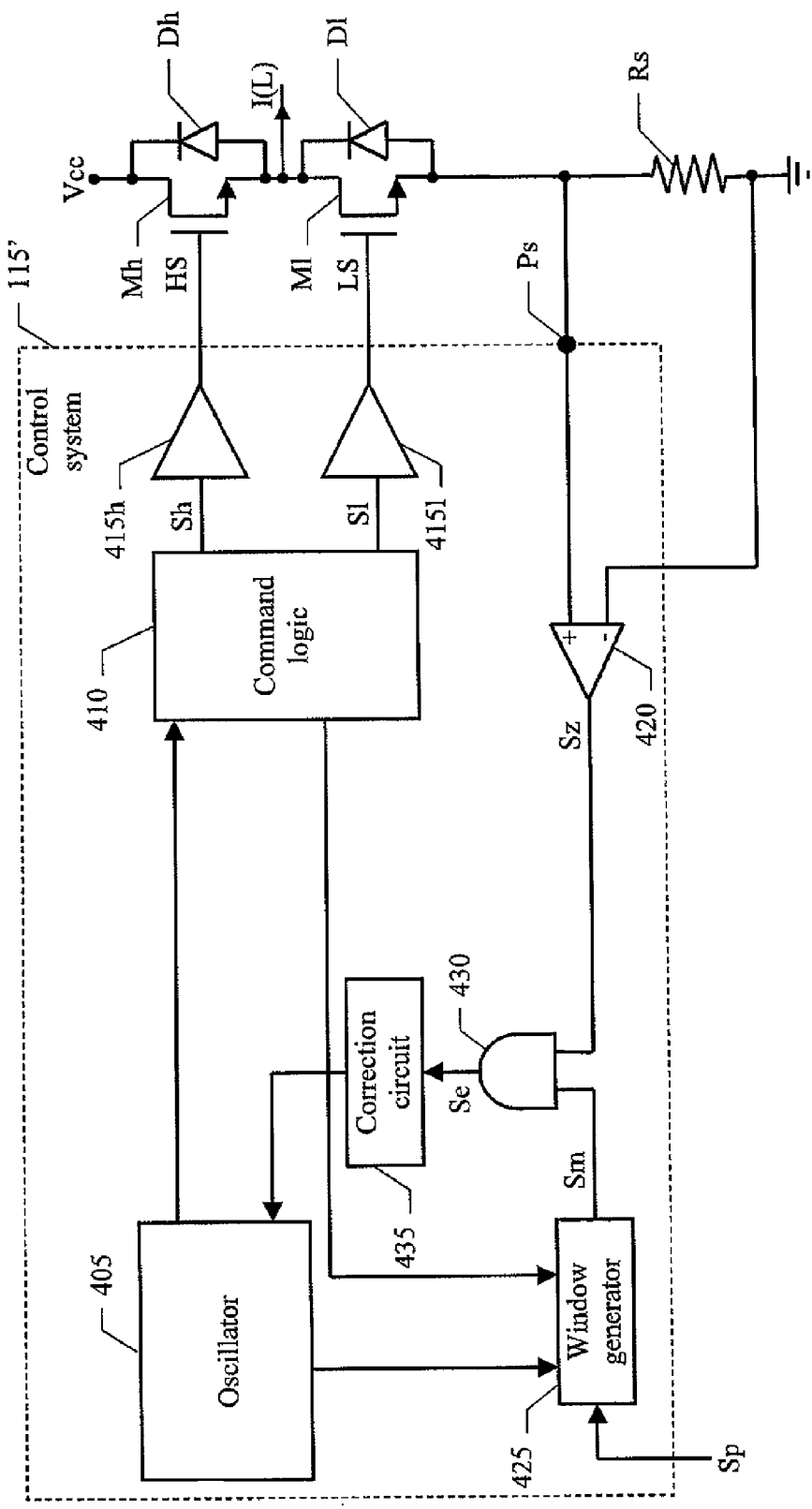
FIG. 4 is a principle block diagram of a control system according to an embodiment of the invention.

Turning to FIG. 4, there is shown a principle block diagram of the control system (differentiated through an apex, that is 115') that is adapted to implement the solution described above according to an embodiment of the invention.

In particular, the control system 115' includes an oscillator 405, which operates at a frequency being double than that of the switching system (that is, 2*fo). The oscillator 405 drives a command logic 410, which generates two logic signals S1 and Sh having halved frequency (that is, fo) corresponding to the signals LS and HS, respectively; the signals S1 and Sh alternatively take a logical value 0 (for example, 0V) and a logical value 1 (for example, equal to a logic supply voltage Vdd=3.5 V). The signal Sh and the signal S1 are supplied to a driver 415h and to a driver 415l, respectively, which consequently generate the corresponding signals HS and LS (with the signals HS,LS at low or high level when the signals Sh,S1 have the value 0 or 1, respectively).

A comparator 420 has a negative input connected to the ground terminal and a positive input connected to a measurement terminal Ps of the control system 115'; the terminal Ps is in turn connected to the source terminal of the transistor M1, so as to receive the voltage V(Rs) across the resistor Rs; an output terminal of the comparator 420 provides a signal Sz that has pulses at the value 1 being representative of each zero-crossing instant.

A window generator 425 is driven by the oscillator 405 (according to the frequency fo) and by the command logic 410 (according to the length of the dead-time Td). The window generator 425 generates a signal Sm that has pulses at the value 1 representative of each observation window Tm; the length of the pulses of the signals Sm is programmable through a programming signal Sp provided from the outside (to a dedicated terminal of the control system 115').

An AND gate 430 receives the signal Sz (from the comparator 420) and the signal Sm to (from the window generator 425), and generates an error signal Se. The error signal Se has pulses at the value 1 representing the detection of the zero-crossing instant (signal Sz at the value 1) within the corresponding observation window Tm (signal Sm at the value 1). The signal Se is provided to a correction circuit 435, which accordingly controls the oscillator 405 (by increasing the frequency fo when the signal Se is at the value 1).

Figure 5:
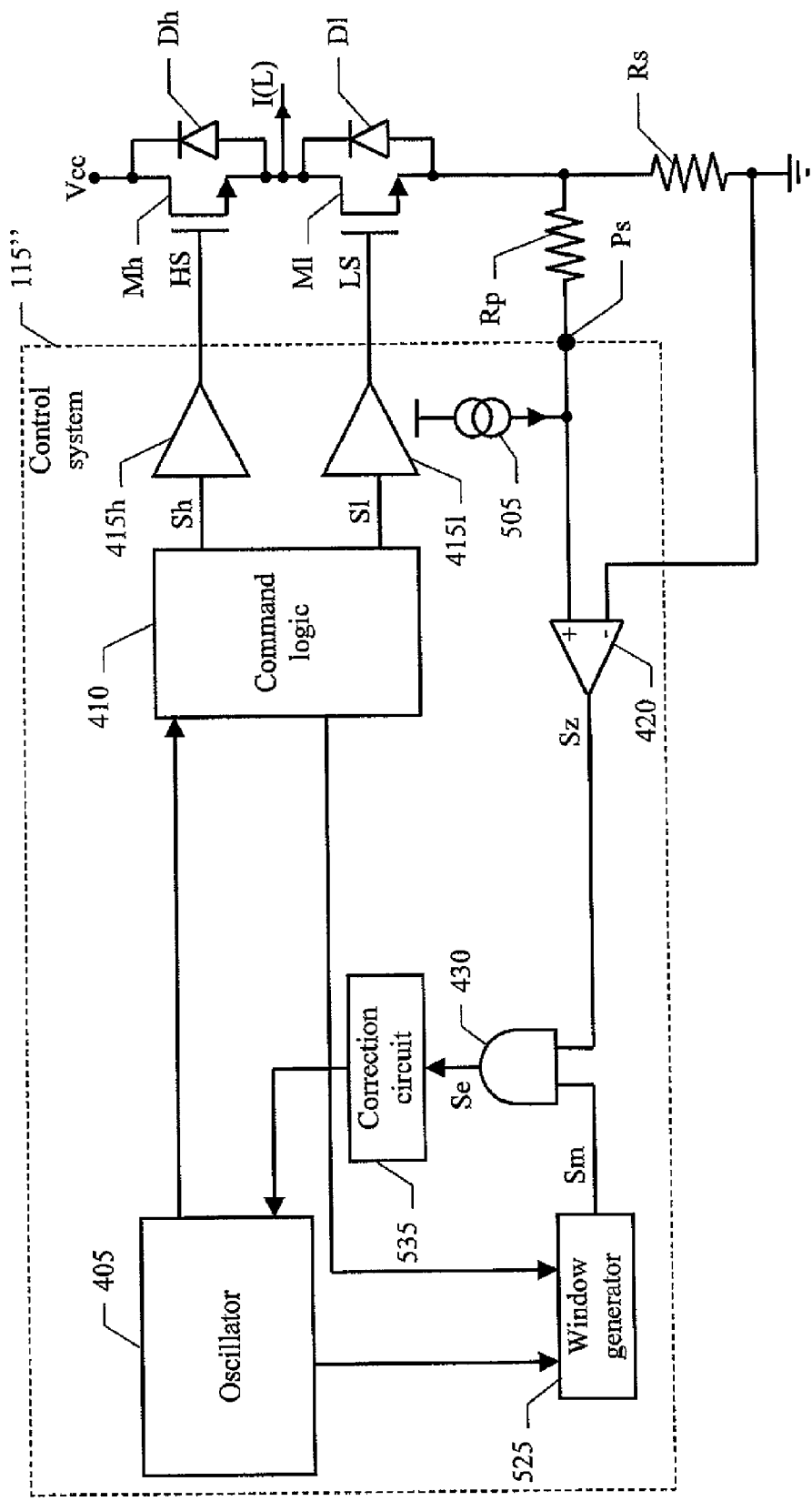
FIG. 5 is a principle block diagram of a control system according to another embodiment of the invention.

With reference instead to FIG. 5, there is shown a principle block diagram of the control system (differentiated with a double apex, that is 115") according to a different embodiment of the invention.

In this case, the window generator—indicated with 525—is not programmable from the outside, so that the observation window Tm (represented by the signal Sm) has a fixed length. The control system 115" instead includes a constant current generator 505, which is connected to the terminal Ps; for example, the current generator 505 may be implemented through a current mirror, which provides a predefined fraction of a control current of the oscillator 405. A programming resistor Rp is placed outside the control system 115", between the source terminal of the transistor M1 and the same terminal Ps. In this way, the positive input terminal of the comparator 420 now receives a voltage equal to the voltage V(Rs) at the resistor Rs plus the voltage at the resistor Rp—equal to the resistance of the resistor Rp multiplied by the current supplied by the current generator 505 (being the comparator 420 at essentially infinite input resistance). The voltage so increased at the positive input terminal of the comparator 420 as a consequence anticipates the instant at which it reaches the reference voltage (at the negative input terminal of the comparator 420), and therefore the detection of the zero-crossing instant represented by the signal Sz; in the comparison between the signals Sz and Sm (in the AND gate 430), this is equivalent to a corresponding increase f the observation window Tm. As a consequence, it is possible to program the operation of the control circuit 115" (in a completely analogous way to the previous case) by acting on the resistor Rp. Such result is obtained without requiring any additional dedicated terminal in the control system 115".

In this case, it is convenient to set the observation window Tm (defined by the window generator 525) to a value that ensures the correct operation of the correction circuit—indicated with 535—in every operating condition. Advantageously, the observation window Tm is set equal to its minimum value defined by the dead-time Td; this allows considerably simplifying the structure of the window generator 525 (without adversely affecting the flexibility of use of the control system 115").

An example of implementation of the solution of FIG. 4 according to an embodiment of to the invention is shown in FIG. 6. Such implementation is based on a (known) oscillator at charge/discharge of a capacitor with voltage ramp at variable slope, which uses two currents being programmable from the outside independently for separately controlling a charge time and a discharge time (with the dead-time equal to the discharge time, and an oscillation period equal to the sum of the discharge time and the charge time).

In detail, such oscillator (indicated with 405') has a terminal Po to which there is connected a capacitor Co (referred to the ground terminal), which is continuously charged and discharged for providing a corresponding oscillating signal.

A terminal P1 is used for defining a discharge current of the capacitor Co. For such purpose, the terminal P1 is kept at a fixed voltage V1 (for example, 3.4V) by a buffer. The buffer is formed by an operational amplifier OP1, which receives the voltage V1 at a non-inverting input terminal (+) thereof; an inverting input terminal (−) of the operational amplifier OP1 is connected to a source terminal of an NMOS transistor M1, which has a gate terminal connected to an output terminal of the operational amplifier OP1. A controlling resistor R1 is connected between the terminal P1 and the ground terminal, so as to obtain the desired discharge current V1/R1. The discharge current is supplied through the transistor M1 to a current mirror referred to a supply terminal Vdd (that provides the corresponding voltage). The current mirror is formed by a PNP BJT transistor T1 having a collector terminal connected to a drain terminal of the transistor M1, and an emitter terminal connected to the supply terminal Vdd. A base terminal of the transistor T1 is short-circuited to its collector terminal, and it is connected to a base terminal of another PNP BJT transistor T2, whose emitter terminal is connected to the supply terminal Vdd. The current mirror T1,T2 is connected to another current mirror referred to the ground terminal (formed in a dual way by two NPN BJT transistors T3 and T4), which transfers the discharge current with the correct direction to a corresponding input terminal S1 of a switch 605.

A terminal P2 is instead used to define a charge current of the capacitor Co. For this purpose, the terminal P2 is kept at a fixed voltage V2 (for example, 4.2V) by a buffer (similarly formed by an operational amplifier OP2 and an NMOS transistor M2). A controlling resistor R2 is connected between the terminal P2 and the ground terminal so as to obtain the desired charge current V2/R2. The charge current is supplied through the transistor M2 to a current mirror referred to the supply terminal Vdd (formed by two PNP BJT transistors T5 and T6), which transfers it to a corresponding input terminal S2 of the switch to 605.

The switch 605 has an output terminal So, which is connected to the terminal Po (and hence to the capacitor Co). The terminal So is also connected to a negative input terminal of a comparator 610b, whose positive input terminal is kept at a fixed voltage Vb (for example, 2.85V); at the same time, the terminal So is connected to a positive input terminal of another comparator 610t, whose negative input terminal is kept at a prefixed voltage Vt>Vb (for example, 4.2V). An output terminal of the comparator 610b and an output terminal of the comparator 610b are connected to a reset terminal R and to a set terminal S, respectively, of a flip-flop 615, which has a main output terminal (Q) and a negated output terminal (Q) providing signals having logical values always opposed to each other. The signal at the terminal Q of the flip-flop 615 is used to control the switch 605. The terminals Q and Q of the flip-flop 615 are also connected to the command logic (not shown in the figure) to generate the signals SkSh accordingly.

Turning instead to the window generator (indicated with 425'), in an embodiment of the invention it includes a resistive divider that reduces the voltage Vt according to the signal Sp. For such purpose, the voltage Vt is applied to two resistors Rpt and Rp2 connected in series to the ground terminal (with the resistor Rp2 that has a variable resistance controlled by the signal Sp); a central tap of the divider Rp1,Rp2 provides a programming voltage Vp equal to a fraction of the voltage Vt (according to the signal Sp). A comparator 625 has an input terminal that receives the positive voltage Vp from the divider Rp1,Rp2, and an input terminal receiving the voltage at the negative terminal Po of the oscillator 405'. An output terminal of the comparator 625 provides the signal Sm (provided to the AND gate 430).

With reference now to the correction circuit (indicated with 435'), it includes a PNP BJT transistor T7, which defines an additional branch of the current mirror T5,T6; for such purpose, the transistor T7 has an emitter terminal and a base terminal that are short-circuited to the emitter terminal and to the base terminal, respectively, of the transistors T5,T6. A collector terminal of the transistor T7 is connected through another current mirror referred to the ground terminal (formed by two NPN BJT transistors T8 and T9) to a terminal Pr of the correction circuit 435'. An enabling NMOS transistor Me is connected in parallel to the transistor T9. In particular, the transistor Me has a drain terminal and a source terminal that are short-circuited to the collector terminal and to the emitter terminal, respectively, of the transistor T9; a gate terminal of the transistor Me receives the negated signal Se (from the AND gate 430). A correction capacitor Cr is connected between the terminal Pr and the ground terminal, and a to correction resistor Rr is connected between the terminal Pr and the terminal P2 of the oscillator 405'.

Figure 6A:
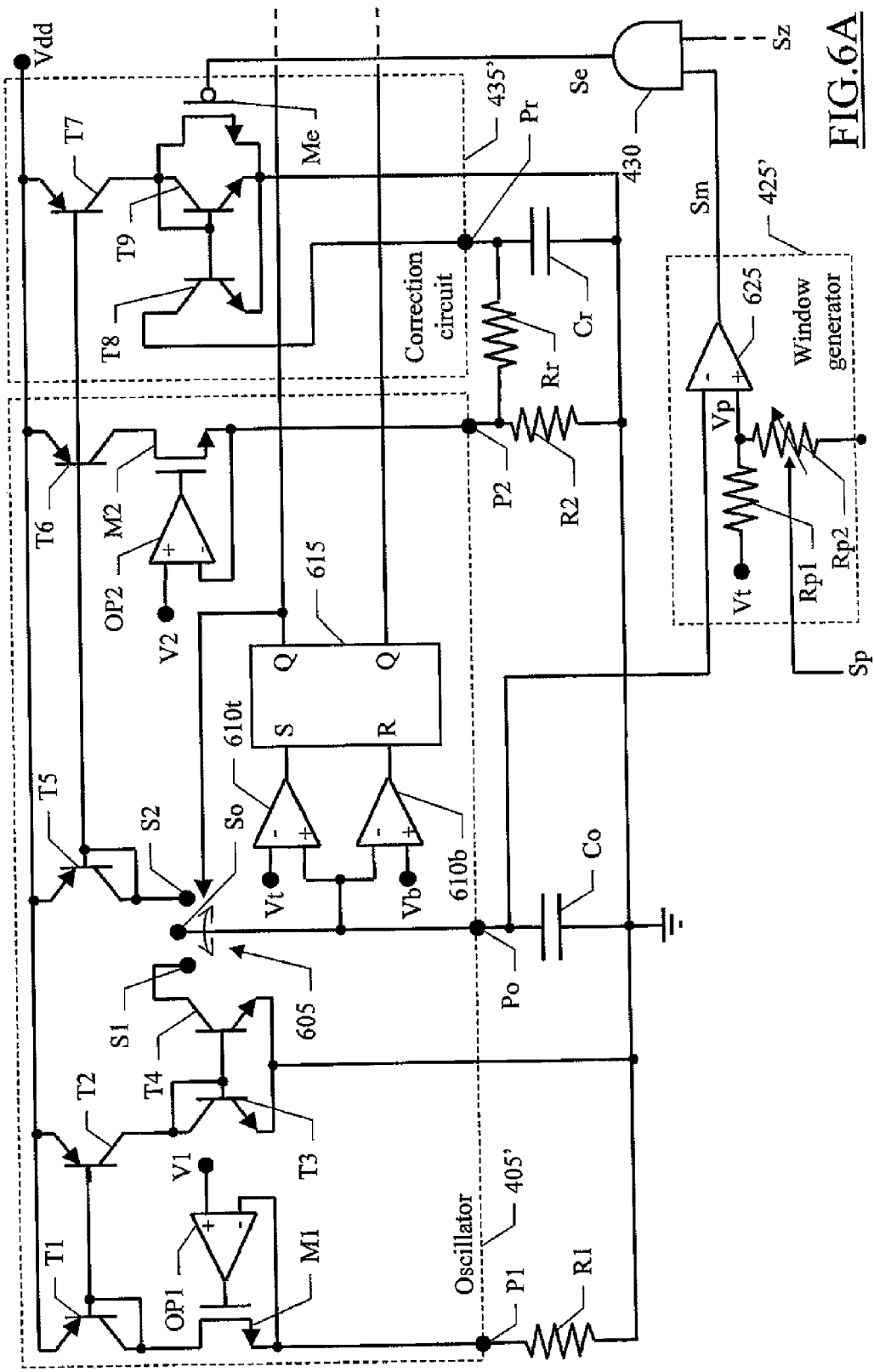
FIG. 6A shows an exemplary implementation of the solution of FIG. 4 according to an embodiment of the invention.
Figure 6B:
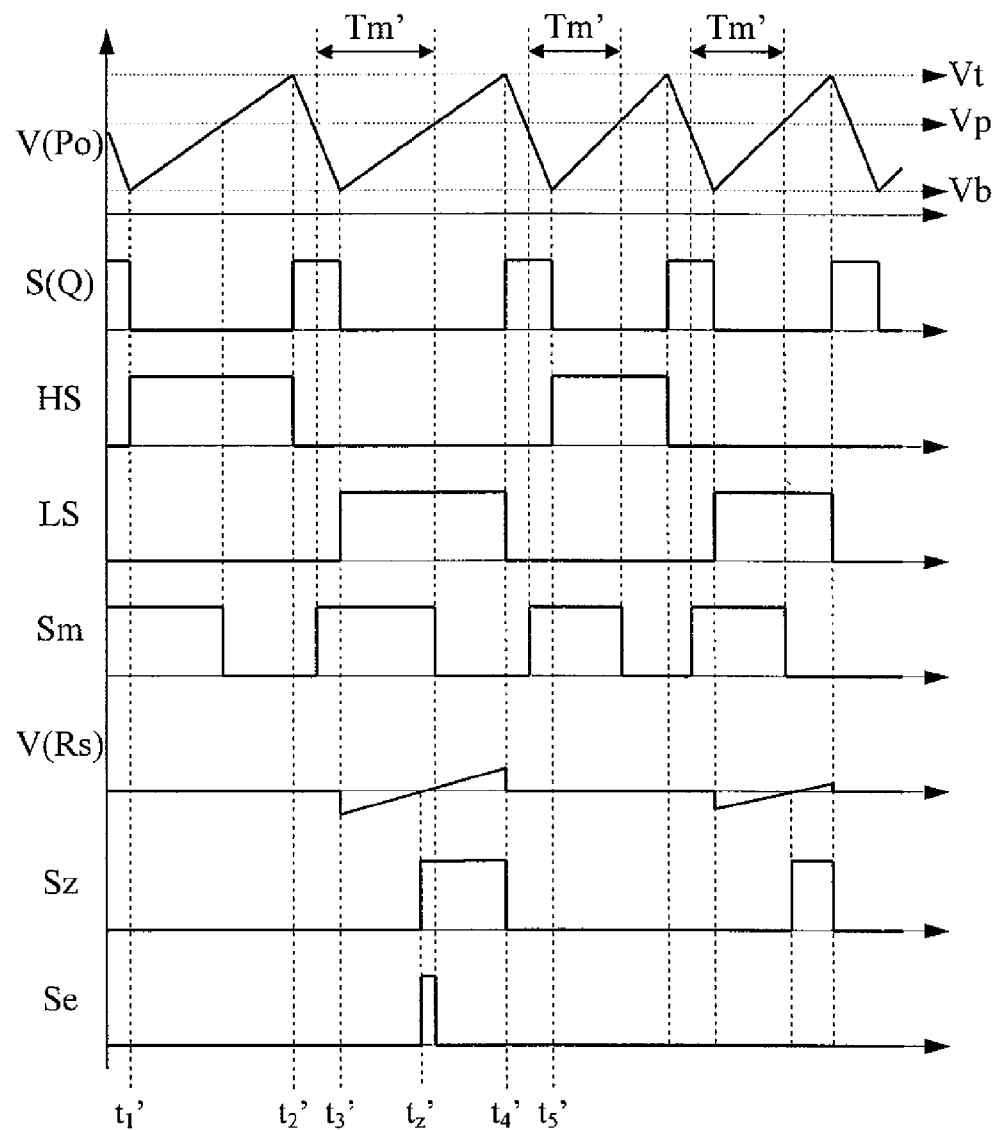
FIG. 6B is a qualitative time diagram showing the waveforms of some electrical quantities of the device of FIG. 6A.

A qualitative time diagram showing the waveforms of some electrical quantities of the circuit of FIG. 6A is illustrated in FIG. 6B. Considering these figures together, let us start from an initial situation (time $t_1'$) wherein the voltage at the terminal Po of the oscillator 405'—denoted by V(Po)— has just decreased to the voltage Vb. In such condition, the comparator 610b provides a signal at the value 1 to the terminal R of the flip-flop 615, so that the signal at its terminal Q—indicated by S(Q)—takes the value 0. The signal S(Q) at the value 0 connects the terminal So to the terminal S2 of the switch 605. As a consequence, the charge current (through the resistor R2) is provided to the terminal Po through the current mirror T5,T6, so as to charge the capacitor Co.

As soon as the voltage V(Po) reaches the voltage Vt (time $t_2'$), the comparator 610t provides a signal at the value 1 to the terminal S of the flip-flop 615, so that the signal S(Q) switches to the value 1; the signal S(Q) at the value 1 instead connects the terminal So to the terminal S1 of the switch 605. As a consequence, the discharge current (through the resistor R1) is now sunk from the terminal Po through the current mirrors T1,T2 and T3,T4, so as to discharge the capacitor Co. When the voltage V(Po) returns to the value Vb (time $t_3'$), the process begins again exactly as above (times $t_3'$, $t_4'$ and $t_5'$, and so on).

As a consequence, the voltage V(Po) has a triangular waveform with a period equal to the sum of a charge time ($t_1'$-$t_2'$, $t_3'$-$t_4'$) plus a discharge time ($t_2'$-$t_3'$, $t_4'$-$t_5'$). The signal S(Q) has the same period, with pulses at the value 1 having a length equal to the discharge time. The frequency of the oscillator 405' (2*fo) is controlled (for controlling the brightness of the lamp) by varying the charge current; in this way, with the increase or decrease of the charge current the slope of the rise ramp of the voltage V(Po) increases or decreases accordingly—always for the same amplitude between the voltages Vb and Vt—by consequently increasing or decreasing the frequency of the oscillator 405'.

The signals HS and LS are generated from the signal S(Q) by bringing them alternatively to the value 1 when the signal S(Q) is at the value 0 (that is, at the times $t_1'$ and $t_3'$, respectively) with a dead-time Td corresponding to the signal S(Q) at the value 1. In such way, the signals LS,HS have a frequency (fo) being halved with respect to that of the oscillator 405'.

The signal Sm is at the value 1 when the voltage V(Po) is lower than the voltage Vp (being set through the signal Sp). Therefore, the signal Sm has pulses at the value 1 beginning during each discharge time (that is, during each dead-time) and lasting for a fraction of the charge time (according to the voltage Vp), each one of them defining a corresponding observation window—indicated with Tm'. The signal Sz, instead, is at the value 1 when the voltage V(Rs) is positive. Therefore, the signal Sz has pulses at the value 1 beginning at each zero-crossing instant—denoted by tz'—and lasting until the LS signal returns to the low level (that is, at the beginning of the next dead-time).

When the pulse of the signal Sz is not overlapped with the corresponding signal Sm (that is, the zero-crossing instant tz' falls within the observation window Tm'), the signal Se is at the value 0. As a consequence, the transistor Me is turned on by the negated signal Se at the value 1, thereby short-circuiting the current mirror T8,T9 to the ground terminal (so as to disable it); in such condition, the capacitor Cr is charged by the charge current to the voltage of the terminal P2 (and it is therefore absolutely immaterial to the operation of the oscillator 405'). On the contrary, as shown in the figure, if the pulse of the signal Sz is (partially) overlapped with the corresponding pulse of the signal Sm (that is, the zero-crossing instant tz' falls within the observation window Tm'), the signal Se takes the value 1 when both the signals Sm and Sz have the value 1; the signal Se has hence a pulse at the value 1 beginning at the zero-crossing instant tz' and ending with the observation window Tm'. As a consequence, the transistor Me is switched off by the corresponding negated signal Se at the value 0, and hence the charge current is now sunk by the terminal Pr (through the current mirrors T5,T7 and T8,T9) so as to discharge the capacitor Cr. The extent of the discharge of the capacitor Cr depends on the length of the pulse of the signal Se (and then the more the zero-crossing instant tz' leads the observation window Tm' the greater the discharge). The voltage difference thus generated between the terminal P2 and the terminal Pr creates a voltage drop on the resistor Rr, with a corresponding current that is added to the charge current provided by the resistor R2. Therefore, the capacitor Co will charge more quickly, thus increasing the frequency of the oscillator 405'. At the end of the pulse of the signal Se, the signal Se returns to the value 1 so as to switch on again the transistor Me, thereby short-circuiting the current mirror T8,T9 to the ground terminal; the capacitor Cr is then re-charged to the voltage of the terminal P2 (restoring the previous situation).

Figure 7:
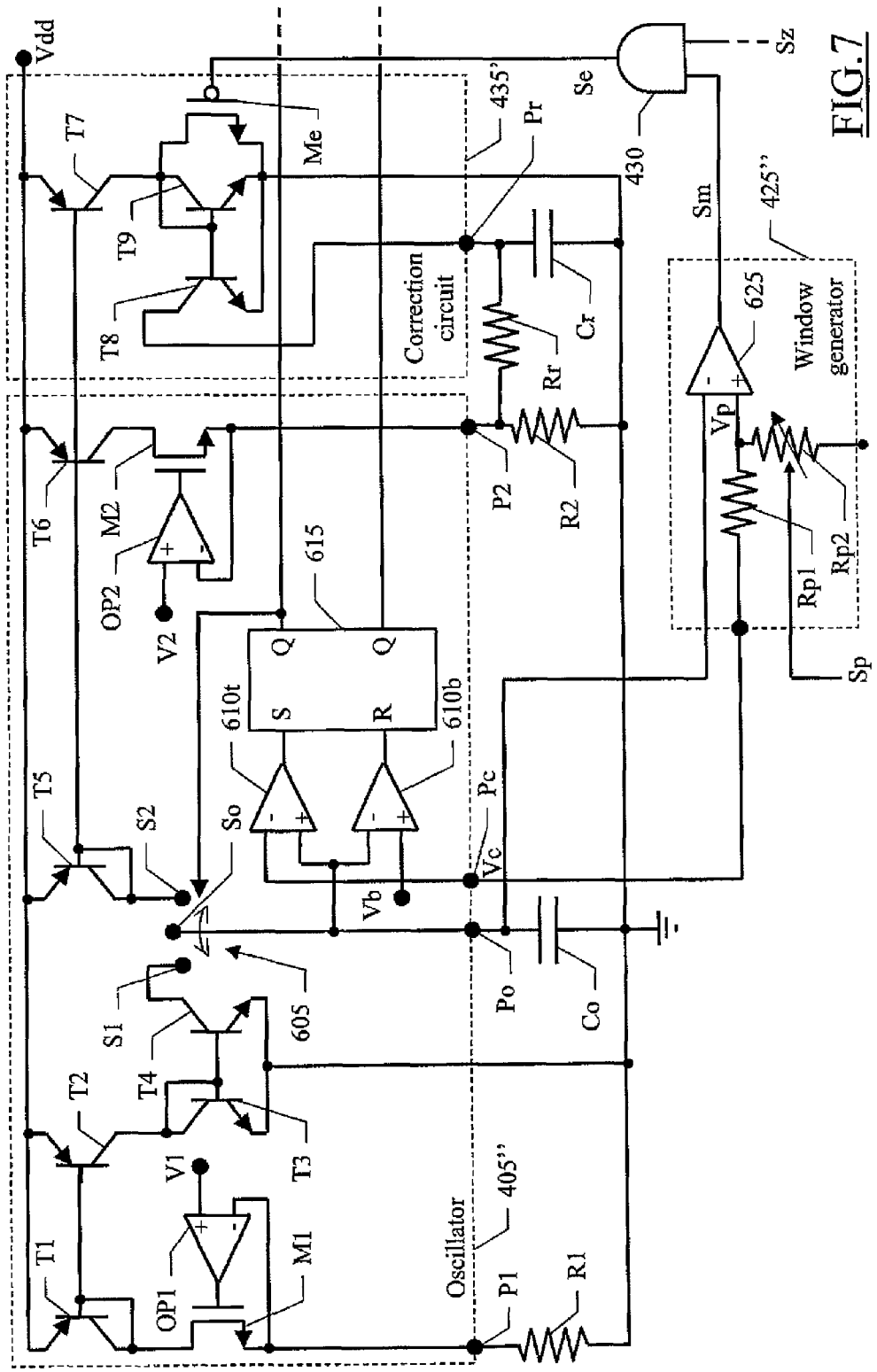
FIG. 7 shows an exemplary implementation of the solution of FIG. 4 according to a different embodiment of the invention.

Another example of implementation of the solution of FIG. 4 according to a different embodiment of the invention is shown in FIG. 7. Such implementation is based on a (known) oscillator at discharge/charge of capacitor with voltage ramps having variable amplitude.

In this case, in the oscillator (indicated with 405') the comparator 610t at its negative to input terminal receives a control voltage Vc, which is set from the outside at a corresponding terminal Pc. The frequency of the oscillator 405" is hence controlled (for controlling the brightness of the lamp) by varying the voltage Vc; in particular, with the increase or decrease of the voltage Vc a correspondingly upper peak value of the rise ramp of the voltage V(Po) increases or decreases—always for the same slope—consequently increasing or decreasing the frequency of the oscillator 405". Similar considerations apply if (in addition or in alternative) there is varied the voltage applied to the positive input terminal of the comparator 610b—and hence the lower peak value of the rise ramp of the voltage V(Po).

As a consequence, in the window generator (indicated with 425"), the divider Rp1,Rp2 will be now connected to the terminal Pc for receiving the same voltage Vc. The operation of the system described above is completely analogous to the previous case.

Figure 8:
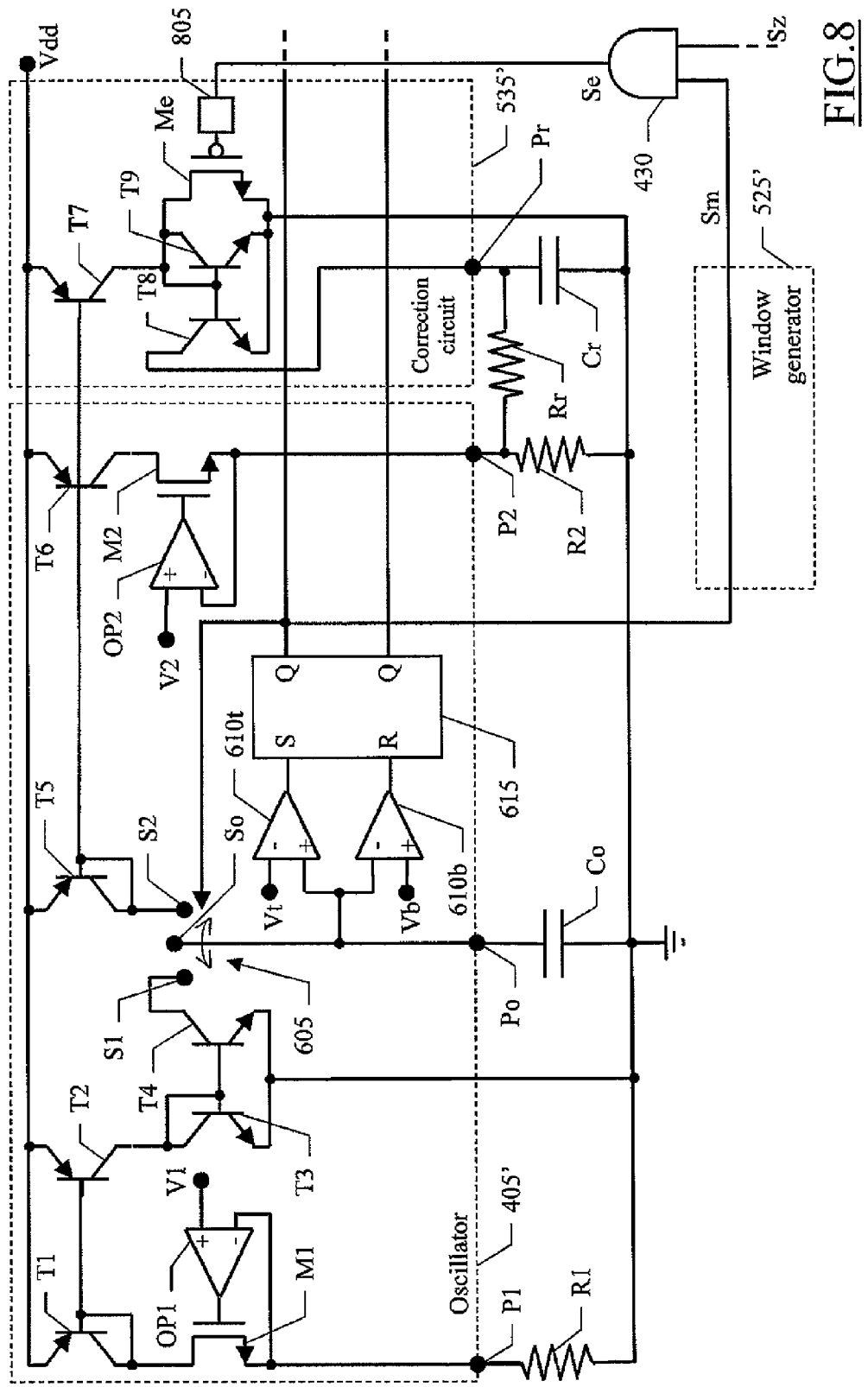
FIG. 8 shows an exemplary implementation of the solution of FIG. 5 according to an embodiment of the invention.

An example of implementation of the solution of FIG. 5 according to an embodiment of the invention is shown in FIG. 8. Such implementation is based on the same oscillator 405' at discharge/charge of capacitor with voltage ramps having variable slope. In such case, the window generator—indicated with 525'—simply short-circuits the terminal Q of the flip-flop 615 to the corresponding input terminal of the AND gate 430, so as to set the signal Sm equal to the signal S(Q); as a consequence, the observation window Tm (represented by the signal Sm) will be exactly equal to the dead-time Td (represented by the signal S(Q)).

Preferably, the correction circuit—indicated with 535'—also includes a monostable 805 being connected between the output terminal of the AND gate 430 and the gate terminal of the transistor Me. The monostable 805 passes from a stable condition (value 0) to an unstable condition (value 1) in response to a trigger signal, and maintains such condition for a prefixed period of time after the removal of the trigger signal (for example, equal to the period 1/fo being multiplied by a predefined factor—such as 2-10). In this way, when the signal Se takes the value 1 (since the zero-crossing instant falls within the observation window Tm), the monostable 805 passes from the value 0 to the value 1, and maintains it at least for such period of time (even if the pulse of the signal Se has a lower length). This allows maintaining the transistor Me switched off long enough to cause a significant increase in the frequency of the oscillator 415' in any condition (even when the observation window Tm is very short).

Similar considerations apply if the solution of FIG. 5 is implemented with the oscillator described above at discharge/charge of capacitor with voltage ramps having variable amplitude (by varying the voltage at the negative input terminal of the comparator 610t and/or at the positive input terminal of the comparator 610b).

The above-described solution (although sufficiently effective in many practical applications) may show some limitations in specific critical conditions (for example, in the case of a severe short-circuit in the lamp).

In particular, as shown in the exemplary scenario of application of FIG. 9, the short-circuit may cause a great leading of the zero-crossing instants. For example, after a zero-crossing instant tz1 sufficiently delayed with respect to a corresponding observation window Tm1, a zero-crossing instant tz2 approaches a corresponding observation window Tm2 (without reaching it); a subsequent zero-crossing instant tz3 is instead so leading to bypass a corresponding observation window Tm3. Therefore, in such condition the zero-crossing instants tz1-tz3 are never within the observation windows Tm1-Tm3 (so that the correction circuit is never activated). Nevertheless, in such a condition the switching on of the low-side transistor (at the switching of the signal SL to the high level in the observation window Tm3) would be in hard mode, with a very high voltage at its terminals.

On the contrary, as shown in the exemplificative scenario of application of FIG. 9B, the short-circuit may bring a zero-crossing instant tz1' within a corresponding observation window Tm1', so that the correction circuit consequently delays the zero-crossing instants. However, a subsequent zero-crossing instant tz2' may be so delayed (with respect to a corresponding observation window Tm2') to completely bypass a subsequent observation window Tm3' as well. Therefore, in such a condition, the zero-crossing instant tz2' is not within any observation window Tm2'-Tm3' (so that the correction circuit is not activated any longer). Nevertheless, in this condition the current I(L) has reversed its phase, so that the operation of the RLC circuit is brought to the capacitive mode—with the turning on of the low-side transistor (signal SL at the high level) in the observation window Tm2 that would occur in hard mode.

In both situations, the hard mode turning on is not detected by the solution described above, since it is based on the gradual variation of the zero-crossing instant. However, it has to be noted that in the first case (FIG. 9A) there are two consecutive zero-crossing instants tz3 and tz2 (not separated by any observation window), whereas in the second case (FIG. 9B) there are two consecutive observation windows Tm2' and Tm3' (not separated by any zero-crossing instant). Therefore, it is possible to detect when the number of zero-crossing instants between two consecutive observation windows is different from 1 (0 or 2, respectively). When this occurs, the control system intervenes by switching off both the transistors of the switching system (for example, temporarily). In this way, it is possible to ensure the correct operation of to the ballast in any operating condition.

Figure 10:
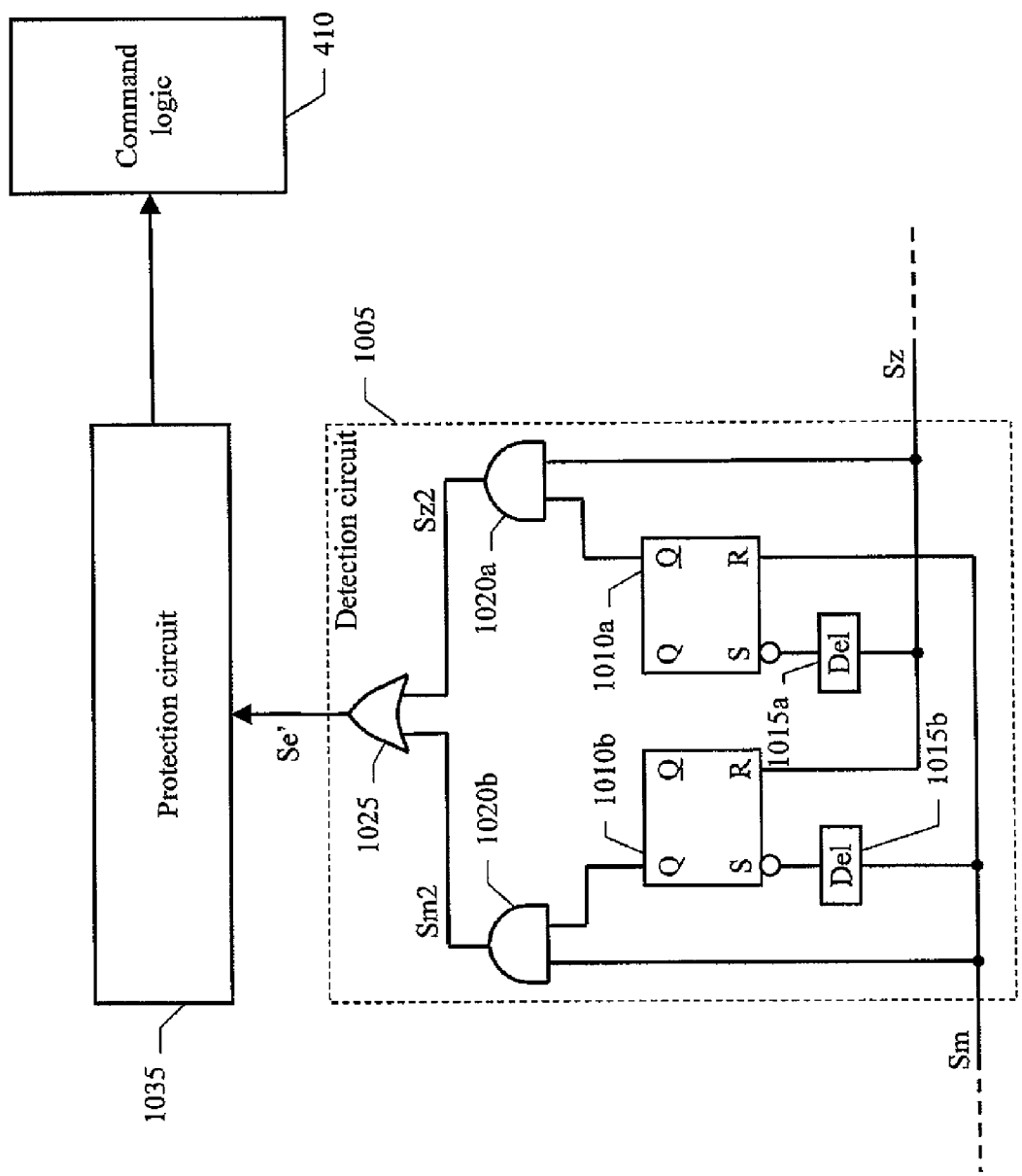
FIG. 10 is a principle block diagram of a particular of the control system according to an embodiment of the invention.

Turning to FIG. 10, there is shown a principle block diagram of a particular of the control system that is adapted to implement the above-described solution according to an embodiment of the invention.

In this case, the control system includes a detection circuit 1005, which receives the signal Sz from the comparator associated with its measurement terminal and the signal Sm from the window generator (not shown in the figure). The detection circuit 1005 is provided with two flip-flops 1010a and 1010b, each one having a reset terminal (R), a set terminal (S), a main output terminal (Q) and a negated output terminal (Q). The signal Sz is provided to the terminal R of the flip-flop 1010b; the same signal Sz is delayed by a block 1015a and it is then negated, with the negated and delayed signal Sz that is then provided to the terminal S of the flip-flop 1010a. A logic AND gate 1020a is input the signal Sz and the signal provided by the terminal Q of the flip-flop 1010a, and outputs a signal of double zero-crossing instant Sz2. In a dual mode, the signal Sm is provided to the terminal R of the flip-flop 1010a; the same signal Sm is delayed by a block 1015b and it is then negated, with the negated and delayed signal Sm that is provided to the terminal S of the flip-flop 1010b. A logic AND gate 1020b is input the signal Sm and the signal provided by the terminal Q of the flip-flop 1010b, and outputs a signal of double observation window Sm2. The detection circuit 1005 also includes an OR gate 1025, which receives the signal Sz2 (from the AND gate 1020a) and the signal Sm2 (from the AND gate 1020b), and generates an error signal Se'. The signal Se' is provided to a protection circuit 1035, which accordingly controls the command logic 410 of the transistors of the switching system (not shown in the figure).

The signal Sm switches to the value 1 at the beginning of each pulse thereof (indicative of the beginning of an observation window); in such condition, the flip-flop 1010a is reset (with the signal at its terminal Q that passes to the value 0); on the contrary, the signal Sz switches to the value 0 at the end of each pulse thereof; in such condition, the flip-flop 1010ta is set (with the signal at its terminal Q that passes to the value 1) after the delay introduced by the block 1015a—for avoiding any race conditions. In a normal situation, in which each zero detection instant follows the beginning of a corresponding observation window, the signal Sz2 is always at the value 0; in fact, when the signal Sz takes the value 1 (at the beginning of its pulse, indicative of the zero-crossing instant), the signal at the terminal Q of the flip-flop 1010b is at the value 0 (since the flip-flop 1010a has been previously reset by the corresponding pulse of the signal Sm). Instead, in case of two consecutive zero detection instants, the signal Sz2 passes to the value 1; in fact, when the signal Sz takes the value 1 the signal at the terminal Q of flip-flop 1010b too is at the value 1 (since the flip-flop 1010a as been set at the end of a previous pulse of the signal Sz without being reset by any pulse of the signal Sm).

In a dual way, the flip-flop 1010a is set at the beginning of each pulse of the signal Sz, and it is reset at the end of each pulse of the signal Sm (after the delay introduced by the block 1015b). Normally, the signal Sm2 is always at the level 0; in fact, when the signal Sm has the value 1 (during each observation window), the signal at the terminal Q of the flip-flop 1010b is at the value 0 (since the flip-flop 1010a has been previously reset by the corresponding pulse of the signal Sz). Instead, in case of two consecutive observation windows, the signal Sm2 passes to the value 1; in fact, when the signal Sm has the value 1 the signal at the terminal Q of the flip-flop 1010b has also the value 1 (since the flip-flop 1010b has been set at the end of a previous pulse of the signal Sm without being reset by any pulse of the signal Sz).

When the signal Sz2 is at the value 1 (to indicate the detection of two consecutive zero-crossing instants) and/or the signal Sm2 is at the value 1 (to indicate the detection of two consecutive observation windows), the signal Se' as well passes to the value 1. In such condition, the protection circuit 1035 controls the command logic 410 to disable the control signals of both the transistors of the switching system for a predetermined time (for example, 10-50 ns). As a consequence, the transistors are switched off for the same time, so as to zero the working current (and hence to switch off the lamp). At this point, it is possible to cool-start the lamp again, with a normal procedure of re-activation of the ballast (for example, of the soft-start mode).

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible. Particularly, different embodiments of the invention may even be practiced without the specific details (such as the numerical examples) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice.

In particular, similar considerations apply if the control system has a different structure or includes equivalent elements; moreover, the elements can be separated to each other or combined together, in whole or in part.

Although in the above description explicit reference has been made to a ballast for controlling the brightness of a fluorescent lamp, such application is merely illustrative and should not be interpreted in a limitative way. For example, the ballast may a have a different structure, it may be used for controlling the brightness of other types of gas discharge lamps; more generally, the same solution may be applied in a resonant inverter, a DC-DC converter based on a resonant inverter, or for controlling any other resonant switching system. Obviously, the switching system may have a different structure or it may include equivalent components—i.e., any other pair of switches in a half-bridge configuration (for example, CMOSs). Similarly, the switching system may be controlled by oscillators (or equivalent circuits) of different types. Moreover, nothing prevents detecting the zero-crossing instants in an equivalent manner, in relation to the low-side transistor, the high-side transistor or both of them. For example, in an alternative embodiment of the present invention, the measuring resistor is connected in series to the lamp between the half-battery capacitor and the ground terminal (with the source terminal of the low-side transistor directly connected to the ground terminal); in this way, it is possible to monitor each zero-crossing instant for both the transistors (when the voltage at the measuring resistor passes from a negative value to a positive value or from a positive value to a negative value, respectively).

The above-mentioned examples of the observation window are purely indicative and in no way limitative; in particular, when the programming is obtained by leading or delaying the detection of the zero-crossing instant the observation window may be fixed to a value even greater than the dead-time (for example, by a predefined fraction thereof). In any case, the possibility of defining the observation window in another way (even independently of the dead-time) is not excluded. In a simplified embodiment of the present invention, it is also possible to provide an observation window being not programmable (for example, equal to a pre-defined fraction of the work frequency).

In any case, the programming of the observation window may be achieved in a different way. For example, in a basic embodiment it is possible to increase it and/or decrease it by predetermined steps (being independent of the working frequency).

Obviously, the programming voltage (used to define the observation window) may be set in another way (for example, by controlling a current through a resistor having a fixed resistance). In any case, nothing prevents fixing the programming voltage (or any other equivalent signal) within the control system.

Similar considerations apply if the zero-crossing instant is varied in another way (by either leading or delaying it), in order to simulate a corresponding change of opposite sign of the observation window.

For example, nothing prevents applying an offset current directly from the outside (with a sign being either equal or opposite to the one of the working current).

The possibility of varying the working frequency in a different way (even without acting on the operation of the oscillator) is not excluded; for example, in alternative implementations of the present invention the working frequency may be varied by a constant amount (regardless of the leading of the zero-crossing instant), or even in a continuous way.

The same results provided by the monostable may be obtained by other circuits being able to ensure a minimum variation of the working frequency (whenever the zero-crossing instant falls within the observation window)—for example, by imposing a minimum length to the signal representing the observation window. In any case, such feature lends itself to be implemented even when the programming window is programmable. On the contrary, it is not strictly necessary even when the programming window is fixed.

Similar considerations apply if the protection circuit responds to the detection of any number of zero-crossing instants between two consecutive observation windows other than a single one; in any case, the protection circuit may act differently (for example, by switching off the ballast completely).

It should be noted that the control system described above lends itself to be made and marketed even separately from the corresponding switching system.

It should be evident that the proposed structure may be part of the design of an integrated circuit. The design may also be created in a programming language; moreover, if the designer does not manufacture chips or masks, the design may be transmitted by physical means to third parties. In any case, the resulting integrated circuit may be distributed by its manufacturer in raw wafer form, as a bare die, or in packages. Moreover, the proposed solution may be integrated with other circuits in the same chip, or it may be mounted in intermediate products and coupled with one or more other chips. In any case, the integrated circuit is suitable to be used in complex systems.

Similar considerations apply if the lighting device (or any other complex system to including the proposed control system) has a different structure or includes equivalent components (separated or combined in whole or in part).

Finally, the proposed solution lends itself to be implemented with an equivalent method (by using similar steps, removing some steps being non-essential, or adding further optional steps); moreover, the steps may be performed in a different order, concurrently or in an interleaved way (at least in part).

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A control system for a resonant switching system, the switching system including a first switch and a second switch in a half-bridge configuration for driving a resonant load, wherein the control system includes:
   command means for switching on and switching off the switches alternatively according to a working frequency of the switching system,
   detection means for detecting a zeroing of a working current being supplied by the switching system to the resonant load in a temporal observation window, the observation to window following each switching off of at least one of the switches and having a length equal to a fraction of a working period of the switching system, and
   correction means for modifying the working frequency in response to each detection of the zeroing in the observation window.

2. The control system according to claim 1, wherein the command means include means for alternatively applying a switching on signal and a switching off signal to each switch with a dead-time between the switching off signal of each switch and the switching on signal of the other switch, the observation window being at least equal to the dead-time.

3. The control system according to claim 1, further including programming means for programming the length of the observation window.

4. The control system according to claim 3, wherein the command means include an oscillator for generating a ramp-like oscillation signal, and means for operating the switching on and the switching off of the switches according to the oscillation signal, the programming means including means for defining the length of the observation window according to a comparison between the oscillation signal and a threshold value.

5. The control system according to claim 4, wherein the programming means includes means for varying the threshold value.

6. The control system according to claim 3, wherein the detection means includes measuring means for measuring a measuring quantity indicative of the working current at a measuring terminal of the control system, the programming means including offset means for applying an offset to the measuring quantity.

7. The control system according to claim 6, wherein the measuring means includes a measuring resistor connected in series to the at least one switch for conducting the working current, and wherein the offset means includes a programming resistor connected between the measuring terminal and the measuring resistor and a current generator for applying a predefined current to the programming resistor, the measuring means measuring a voltage at the measuring terminal being defined by the sum of the voltage at the measuring resistor and to the voltage at the programming resistor.

8. The control system according to claim 1, wherein the correction means includes incrementing means for incrementing the working frequency by an amount corresponding to a difference between the detection of the zeroing and an end of the observation window.

9. The control system according to claim 8, wherein the incrementing means includes means for incrementing the working frequency by a minimum amount in response to each detection of the zeroing in the observation window.

10. The control system according to claim 1, further including:
means for detecting a number of zeroing different from one between two consecutive observation windows, and
means for switching off the switches in response to each detection of the number of zeroing different from one.

11. A controller for a resonant switching system comprising:
a detector configured to detect whether a zeroing of a working current supplied by a first switch and a second switch of the resonant switching system falls within a pre-programmed temporal interval that follows a switching off of at least one of the first and second switches; and
a correction circuit configured to modify a working frequency of the resonant switching system responsive to the zeroing falling within the pre-programmed temporal interval.

12. The controller of claim 11, wherein the pre-programmed temporal interval is a fraction of the period of the working frequency.

13. The controller of claim 11, wherein the correction circuit is configured to modify the working frequency so as to move the zeroing outside the pre-programmed temporal interval.

14. The controller of claim 11, wherein the first switch and the second switch are configured to provide current to a resonant load.

15. The controller of claim 11, wherein the correction circuit is configured to modify the working frequency by an amount corresponding to a difference between the occurrence of the zeroing and an end of the pre-programmed temporal interval.

16. The controller of claim 11, wherein the detector is further configured to detect a number of zeroings greater than one between two consecutive pre-programmed temporal intervals.

17. The controller of claim 16, further comprising means to switch off the first and second switches responsive to detection of a number of zeroings greater than one between two consecutive pre-programmed temporal intervals.

18. The controller of claim 16, further comprising a first driving terminal configured to connect to a control terminal of the first switch; and
a second driving terminal configured to connect to a control terminal of the second switch.

19. The controller of claim 11, wherein the detector comprises a comparator configured to compare a voltage representative of a current supplied by the first and second switches to a reference voltage.

20. The controller of claim 19, wherein the detector further comprises an AND gate configured to logically compare an output from the comparator with a programmable pulse train received from a window generator.

21. The controller of claim 20, wherein the window generator is configured to receive an oscillating signal from an oscillator, and the oscillator determines the working frequency of the resonant switching system.

22. The controller of claim 20, wherein the controller is configured to modify the working frequency based upon an output from the AND gate.

23. A method for controlling a resonant switching system comprising:
detecting whether a zeroing of a working current supplied by a first switch and a second switch of the resonant switching system falls within a pre-programmed temporal interval that follows a switching off of at least one of the first and second switches; and
modifying a working frequency of the resonant switching system responsive to the zeroing falling within the pre-programmed temporal interval.

24. The method of claim 23, wherein the pre-programmed temporal interval is a fraction of the period of the working frequency.

25. The method of claim 23, wherein the modifying comprises modifying the working frequency so as to move the zeroing outside the pre-programmed temporal interval.

26. The method of claim 23, further comprising providing, by the first switch and the second switch, current to a resonant load.

27. The method of claim 23, wherein the modifying comprises modifying the working frequency by an amount corresponding to a difference between the occurrence of the zeroing within the pre-programmed temporal interval and an end of the pre-programmed temporal interval.

28. The method of claim 23, further comprising detecting a number of zeroings greater than one between two consecutive pre-programmed temporal intervals.

29. The method of claim 28, further comprising switching off the first and second switches responsive to detecting a number of zeroings greater than one between two consecutive pre-programmed temporal intervals.

30. The method of claim 28, further comprising:
providing a first driving signal to a control terminal of the first switch; and
providing a second driving signal to a control terminal of the second switch.

31. The method of claim 23, wherein the detecting comprises comparing, with a comparator, a voltage representative of a current supplied by the first and second switches to a reference voltage.

32. The method of claim 31, wherein the detecting further comprises logically comparing, with an AND gate, an output from the comparator with a programmable pulse train received from a window generator.

33. The method of claim 32, wherein the window generator receives an oscillating signal from an oscillator and the oscillator determines the working frequency of the resonant switching system.

34. The method of claim 32, wherein the modifying the working frequency is based upon an output from the AND gate.

* * * * *

UNITED STATES PATENT AND TRADEMARK OFFICE
CERTIFICATE OF CORRECTION

| | |
|---|---|
| PATENT NO. | : 8,212,591 B2 |
| APPLICATION NO. | : 13/109314 |
| DATED | : July 3, 2012 |
| INVENTOR(S) | : Albino Pidutti et al. |

It is certified that error appears in the above-identified patent and that said Letters Patent is hereby corrected as shown below:

On the title page, line 11 of the Abstract should read:
a length equal to a fraction of a working period of the Col. 1, line 16, should read:
NANT SWITCHING SYSTEM WITH MONITORING Col. 2, line 45, should read:
closed loop changes sign, turning a feedback being Col. 5, line 28, should read:
from this value). On the contrary, when the lamp 105

Col. 7, line 42, should read:
tive mode), the increase of the frequency of being forced by Col. 9, line 5, should read:
according to an embodiment of the invention is shown in Col. 9, line 53, should read:
the switch 605.

Col. 10, line 36, should read:
a correction resistor Rr is connected between the terminal Col. 11, line 67, should read:
comparator 610t at its negative input terminal receives a Col. 13, line 34, should read:
tion of the ballast in any operating condition.

Signed and Sealed this
Fourteenth Day of August, 2012

David J. Kappos
*Director of the United States Patent and Trademark Office*

CERTIFICATE OF CORRECTION (continued)
U.S. Pat. No. 8,212,591 B2

Col. 16, line 29, should read:
other complex system including the proposed control sys Col. 16, line 58, should read:
vation window following each switching off of at least Col. 17, line 33, should read:
resistor and the voltage at the programming resistor